US011367208B2

(12) United States Patent
Zhang et al.

(10) Patent No.: US 11,367,208 B2
(45) Date of Patent: Jun. 21, 2022

(54) IMAGE-BASED KEYPOINT GENERATION

(71) Applicant: DeepMap Inc., Palo Alto, CA (US)

(72) Inventors: Ronghua Zhang, Campbell, CA (US);
Derik Schroeter, Fremont, CA (US);
Mengxi Wu, Mountain View, CA (US);
Di Zeng, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 215 days.

(21) Appl. No.: 16/912,549

(22) Filed: Jun. 25, 2020

(65) Prior Publication Data
US 2020/0410702 A1    Dec. 31, 2020

Related U.S. Application Data

(60) Provisional application No. 62/866,362, filed on Jun. 25, 2019.

(51) Int. Cl.
| | |
|---|---|
| *G06T 7/521* | (2017.01) |
| *G01C 21/32* | (2006.01) |
| *G06T 7/73* | (2017.01) |
| *G01S 17/89* | (2020.01) |

(52) U.S. Cl.
CPC ............ *G06T 7/521* (2017.01); *G01C 21/32* (2013.01); *G01S 17/89* (2013.01); *G06T 7/73* (2017.01)

(58) Field of Classification Search
CPC .......... G06T 7/521; G06T 7/73; G01C 21/32; G01C 21/3837; G01S 17/89; G01S 17/931
See application file for complete search history.

(56) References Cited

U.S. PATENT DOCUMENTS

| | | | |
|---|---|---|---|
| 7,187,809 B2 | 3/2007 | Zhao et al. | |
| 11,222,442 B2 * | 1/2022 | Bao | ............................ G06T 7/73 |
| 2018/0357773 A1 * | 12/2018 | Wang | ....................... G06T 7/246 |

(Continued)

FOREIGN PATENT DOCUMENTS

WO    2019/024793 A1    2/2019

OTHER PUBLICATIONS

Feng et al, (2D3D-MatchNet: Learning to Match Keypoints Across 2D Image and 3D Point Cloud, IEEE, pp. 4790-4796, May 2019 (Year: 2019).*

(Continued)

*Primary Examiner* — Amara Abdi
(74) *Attorney, Agent, or Firm* — Maschoff Brennan

(57) ABSTRACT

Operations may comprise obtaining a plurality of light detection and ranging (LIDAR) scans of a region. The operations may also comprise identifying a plurality of LIDAR poses that correspond to the plurality of LIDAR scans. In addition, the operations may comprise identifying, as a plurality of keyframes, a plurality of images of the region that are captured during capturing of the plurality of LIDAR scans. The operations may also comprise determining, based on the plurality of LIDAR poses, a plurality of camera poses that correspond to the keyframes. Further, the operations may comprise identifying a plurality of two-dimensional (2D) keypoints in the keyframes. The operations also may comprise generating one or more three-dimensional (3D) keypoints based on the plurality of 2D keypoints and the respective camera poses of the plurality of keyframes.

20 Claims, 13 Drawing Sheets

(56) References Cited

U.S. PATENT DOCUMENTS

2019/0107839 A1\* 4/2019 Parashar ............... G05D 1/0219
2020/0410701 A1\* 12/2020 Chen ....................... G06T 7/521

OTHER PUBLICATIONS

Feng et al., "2D3D-MatchNet: Learning to Match Keypoints Across 2D Image and 3D Point Cloud." 2019 International Conference on Robotics and Automation, Apr. 22, 2019.
PCT International Search Report and Written Opinion issued in corresponding application No. PCT/US2020/039703, dated Sep. 30, 2020.

\* cited by examiner

IMAGE-BASED KEYPOINT GENERATION

CROSS-REFERENCE TO RELATED APPLICATION

This patent application claims the benefit of and priority to U.S. Provisional App. No. 62/866,362 filed Jun. 25, 2019, which is incorporated by reference in the present disclosure in its entirety.

FIELD

The embodiments discussed herein are related to image-based keypoint generation.

BACKGROUND

Autonomous vehicles, also known as self-driving cars, driverless cars, or robotic cars, may drive from a source location to a destination location without requiring a human driver to control or navigate the vehicle. Automation of driving may be difficult for several reasons. For example, autonomous vehicles may use sensors to make driving decisions on the fly, or with little response time, but vehicle sensors may not be able to observe or detect some or all inputs that may be required or useful to safely control or navigate the vehicle safely in some instances. Vehicle sensors may be obscured by corners, rolling hills, other vehicles, etc. Vehicles sensors may not observe certain inputs early enough to make decisions that may be necessary to operate the vehicle safely or to reach a desired destination. In addition, some inputs, such as lanes, road signs, or traffic signals, may be missing on the road, may be obscured from view, or may not be readily visible, and therefore may not be detectable by sensors. Furthermore, vehicle sensors may have difficulty detecting emergency vehicles, a stopped obstacle in a given lane of traffic, or road signs for rights of way.

SUMMARY

According to an aspect of the embodiment, operations may comprise obtaining a plurality of light detection and ranging (LIDAR) scans of a region. The operations may also comprise identifying a plurality of LIDAR poses in which each LIDAR pose of the plurality of LIDAR poses corresponds to a respective LIDAR scan of the plurality of LIDAR scans. In addition, the operations may comprise identifying, as a plurality of keyframes, a plurality of images of the region that are captured during capturing of the plurality of LIDAR scans. The operations may also comprise determining, based on the plurality of LIDAR poses, a plurality of camera poses in which each respective camera pose of the plurality of camera poses corresponds to a respective keyframe of the plurality of keyframes. Further, the operations may comprise identifying a plurality of two-dimensional (2D) keypoints, including identifying one or more respective 2D keypoints in a corresponding keyframe of each of the keyframes. Each respective 2D keypoint corresponds to a respective feature of the region as included in the corresponding keyframe. The operations also may comprise generating one or more three-dimensional (3D) keypoints based on the plurality of 2D keypoints and the respective camera poses of the respective keyframes of the plurality of keyframes.

The subject matter claimed herein is not limited to embodiments that solve any disadvantages or that operate only in environments such as those described above. Rather, this background is only provided to illustrate one example technology area where some embodiments described herein may be practiced.

DETAILED DESCRIPTION

Overview

Figure 1:
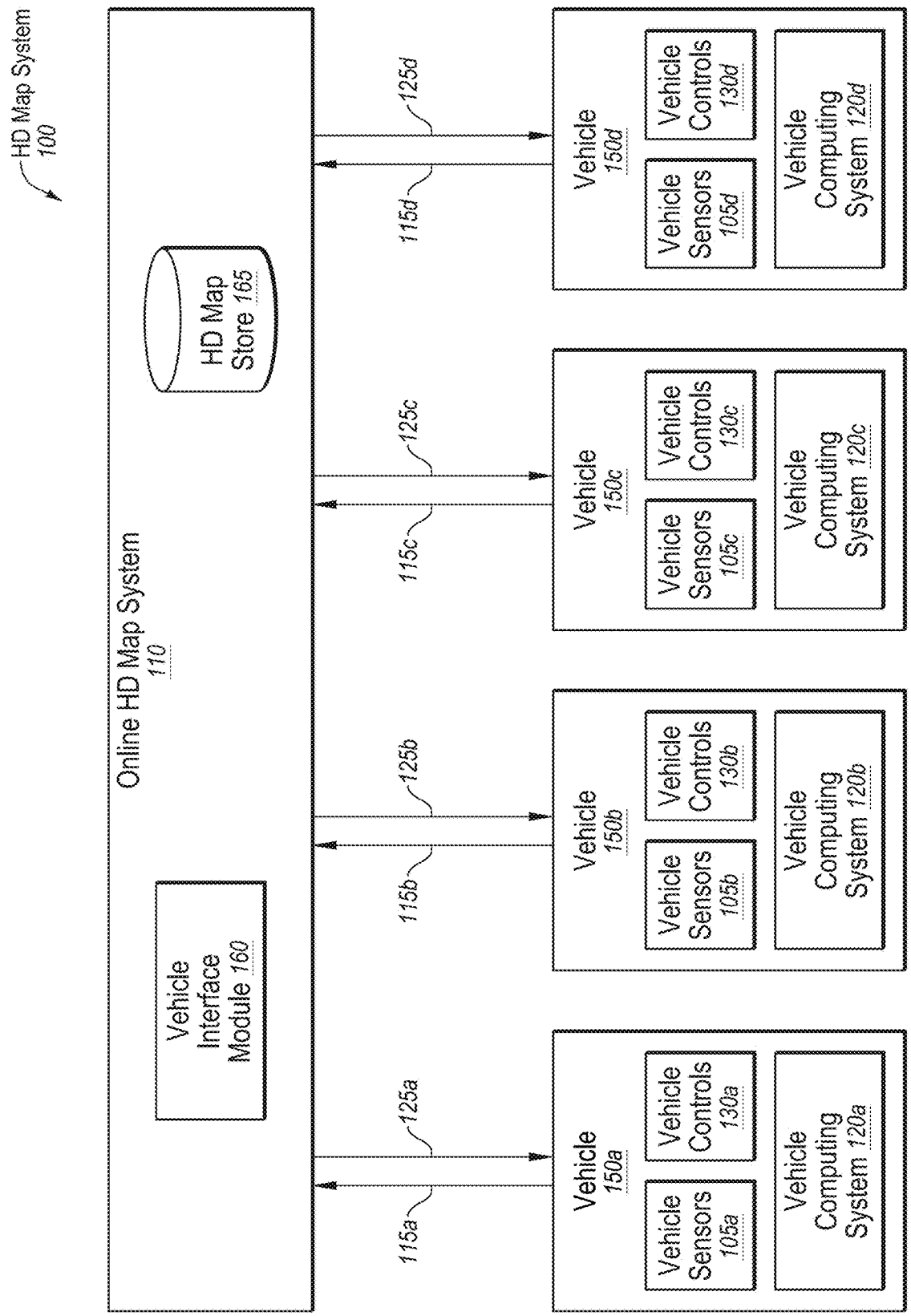
FIG. 1 illustrates an example overall system environment of an HD map system interacting with multiple vehicle computing systems.

Autonomous vehicles may use map data to discover some of the above information rather than relying on sensor data. However, conventional maps have several drawbacks that may make them difficult to use for an autonomous vehicle. For example, conventional maps may not provide the level of precision or accuracy that for navigation within a certain safety threshold (e.g., accuracy within 30 centimeters (cm) or better). Further, global positioning systems (GPS) may provide accuracies of approximately 3-5 meters (m) but have large error conditions that may result in accuracies of over 100 m. This lack of accuracy may make it challenging to accurately determine the location of the vehicle on a map or to identify (e.g., using a map, even a highly precise and accurate one) a vehicle's surroundings at the level of precision and accuracy desired.

Furthermore, conventional maps may be created by survey teams that may use drivers with specially outfitted survey cars with high resolution sensors that may drive around a geographic region and take measurements. Geographic region, region, area, etc. may be used synonymously within this disclosure and may be used to describe a portion of land that may form part of the surface of the earth. The measurements may be provided to a team of map editors that may assemble one or more maps from the measurements. This process may be expensive and time consuming (e.g., taking weeks to months to create a comprehensive map). As a result, maps assembled using such techniques may not have fresh data. For example, roads may be updated or modified on a much more frequent basis (e.g., rate of roughly 5-10% per year) than a survey team may survey a given region. For example, survey cars may be expensive and limited in number, making it difficult to capture many of these updates or modifications. For example, a survey fleet may include a thousand survey cars. Due to the large number of roads and the drivable distance in any given state in the United States, a survey fleet of a thousand cars may not cover the same area at the same frequency of road changes to keep the map up to date on a regular basis and to facilitate safe self-driving of autonomous vehicles. As a result, conventional techniques of maintaining maps may be unable to provide data that is sufficiently accurate and up to date for the safe navigation of autonomous vehicles.

Embodiments of the present disclosure may perform global visual localization of an autonomous vehicle using keyframes and keypoints and may create, maintain, and store high definition (HD) maps that may include up-to-date information with high accuracy or precision given an initial estimation of a pose and one or more images captured by one or more cameras of an autonomous vehicle. The HD maps may be used by an autonomous vehicle to safely navigate to various destinations without human input or with limited human input. In the present disclosure reference to "safe navigation" may refer to performance of navigation within a target safety threshold. For example, the target safety threshold may be a certain number of driving hours without an accident. Such thresholds may be set by automotive manufacturers or government agencies. Additionally, reference to "up-to-date" information does not necessarily mean absolutely up to date, but up to date within a target threshold amount of time. For example, a target threshold amount of time may be one week or less such that a map that reflects any potential changes to a roadway that may have occurred within the past week may be considered "up-to-date". Such target threshold amounts of time may vary anywhere from one month to 1 minute, or possibly even less.

The autonomous vehicle may be a vehicle capable of sensing its environment and navigating without human input. An HD map may refer to a map that may store data with high precision and accuracy, for example, with accuracies of approximately 2-30 cm.

Some embodiments may generate HD maps that may contain spatial geometric information about the roads on which the autonomous vehicle may travel. Accordingly, the generated HD maps may include the information that may allow the autonomous vehicle to navigate safely without human intervention. Some embodiments may gather and use data from the lower resolution sensors of the self-driving vehicle itself as it drives around rather than relying on data that may be collected by an expensive and time-consuming mapping fleet process that may include a fleet of vehicles outfitted with high resolution sensors to create HD maps. The autonomous vehicles may have no prior map data for these routes or even for a given region. A region or area may refer to a defined area of land. Some embodiments may provide location as a service (LaaS) such that autonomous vehicles of different manufacturers may gain access to the most up-to-date map information collected, obtained, or created via the aforementioned processes.

Some embodiments may generate and maintain HD maps that may be accurate and may include up-to-date road conditions for safe navigation of the autonomous vehicle. For example, the HD maps may provide the current location of the autonomous vehicle relative to one or more lanes of roads precisely enough to allow the autonomous vehicle to drive safely in and to maneuver safety between one or more lanes of the roads.

HD maps may store a very large amount of information, and therefore may present challenges in the management of the information. For example, an HD map for a given region may be too large to store on a local storage of the autonomous vehicle. Some embodiments may provide a portion of an HD map to the autonomous vehicle that may allow the autonomous vehicle to determine its current location in the HD map, determine the features on the road relative to the autonomous vehicle's position, determine if it is safe to move the autonomous vehicle based on physical constraints and legal constraints, etc. Examples of such physical constraints may include physical obstacles, such as walls, barriers, medians, curbs, etc. and examples of legal constraints may include an allowed direction of travel for a lane, lane restrictions, speed limits, yields, stops, following distances, etc.

Some embodiments of the present disclosure may allow safe navigation for an autonomous vehicle by providing relatively low latency, for example, 5-40 milliseconds or less, for providing a response to a request; high accuracy in terms of location, for example, accuracy within 30 cm or better; freshness of data such that a map may be updated to reflect changes on the road within a threshold time frame, for example, within days, hours, minutes or seconds; and storage efficiency by reducing or minimizing the storage used by the HD Map.

In some embodiments, an autonomous vehicle may capture camera images at a higher frequency than other sensors such as a light detection and ranging (LIDAR), GPS, radar, etc. As such, in some instances, the use of camera images to localization of vehicles may allow for faster updating of the localization than by using data that may be obtained from other sensors. However, determining localization based on camera images alone may be difficult or inaccurate.

According to one or more implementations of the present disclosure, the autonomous vehicle may comprise a vehicle computer system configured to obtain an initial pose for a vehicle in a region using sensor data from one or more sensors of the vehicle For example, the vehicle computer system may receive and use LIDAR data to obtain an initial pose for the vehicle in the region. As another example, the vehicle computer system may additionally or alternatively receive and use GPS data to obtain the initial pose for the vehicle in the region.

As detailed below, the vehicle computer system may perform image-based localization using the initial pose for the vehicle in the region. The use of the initial pose may improve the accuracy and reliability of the image-based localization by directing the image-based localization operations to be performed with respect to certain features in the region (e.g., certain objects or certain features of certain objects, etc.) that are within a certain distance of the initial pose.

The objects and advantages of the embodiments will be realized and achieved at least by the elements, features, and combinations particularly pointed out in the claims.

Both the foregoing general description and the following detailed description are given as examples and are explanatory and are not restrictive of the invention, as claimed.

Embodiments of the present disclosure are explained with reference to the accompanying drawings.

System Environment of HD Map System

FIG. 1 illustrates an example overall system environment of an HD map system 100 that may interact with multiple vehicles, according to one or more embodiments of the present disclosure. The HD map system 100 may comprise an online HD map system 110 that may interact with a plurality of vehicles 150 (e.g., vehicles 150a-d) of the HD map system 100. The vehicles 150 may be autonomous vehicles or non-autonomous vehicles.

The online HD map system 110 may be configured to receive sensor data that may be captured by sensors of the vehicles 150 and combine data received from the vehicles 150 to generate and maintain HD maps. The online HD map system 110 may be configured to send HD map data to the vehicles 150 for use in driving the vehicles 150. In some embodiments, the online HD map system 110 may be implemented as a distributed computing system, for example, a cloud-based service that may allow clients such as a vehicle computing system 120 (e.g., vehicle computing systems 120a-d) to make requests for information and services. For example, a vehicle computing system 120 may make a request for HD map data for driving along a route and the online HD map system 110 may provide the requested HD map data to the vehicle computing system 120.

FIG. 1 and the other figures use like reference numerals to identify like elements. A letter after a reference numeral, such as "105A," indicates that the text refers specifically to the element having that particular reference numeral. A reference numeral in the text without a following letter, such as "105," refers to any or all of the elements in the figures bearing that reference numeral (e.g. "105" in the text refers to reference numerals "105A" and/or "105N" in the figures).

Figure 4:
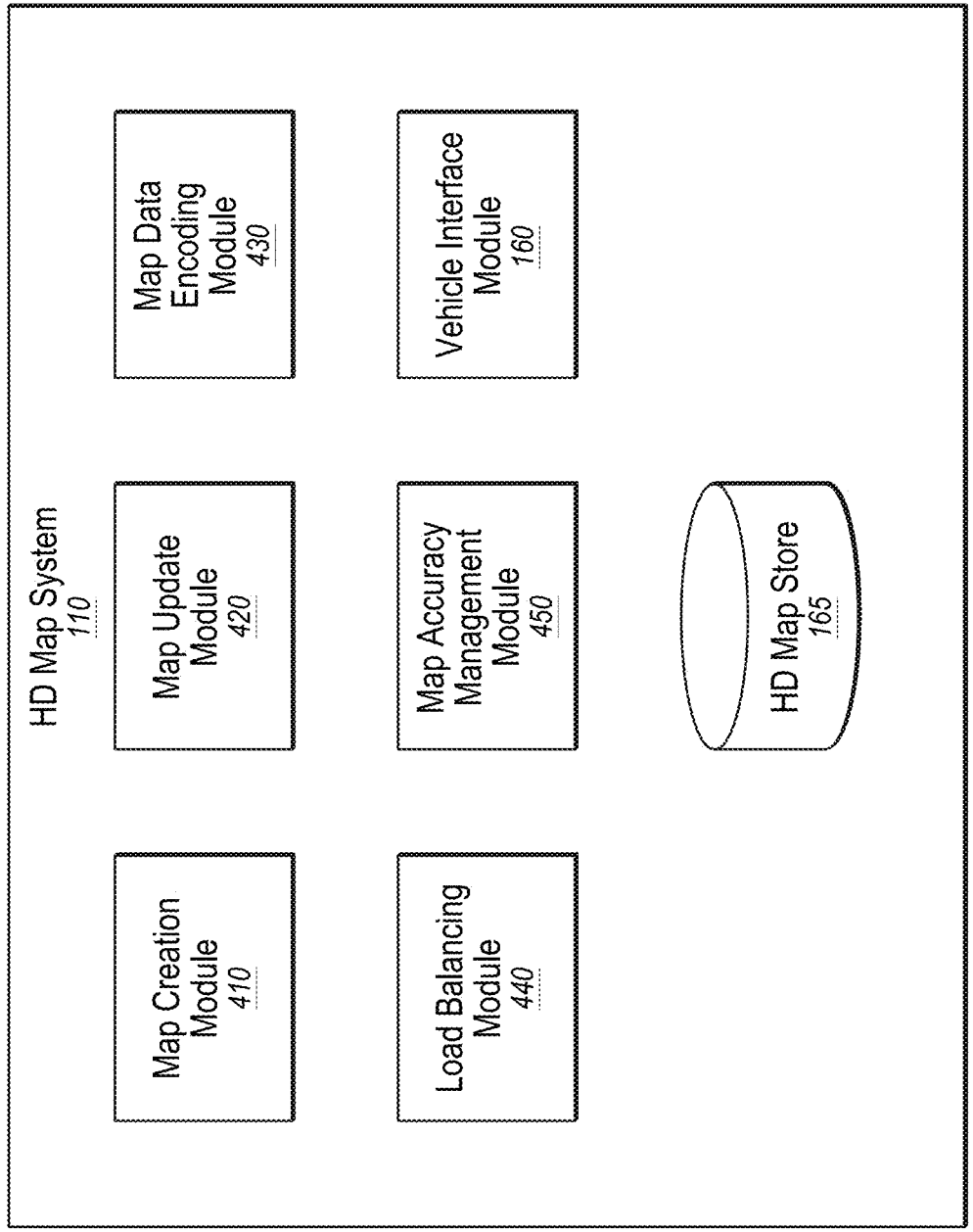
FIG. 4 illustrates an example of system architecture of an online HD map system.

The online HD map system 110 may comprise a vehicle interface module 160 and an HD map store 165. The online HD map system 110 may be configured to interact with the vehicle computing system 120 of various vehicles 150 using the vehicle interface module 160. The online HD map system 110 may be configured to store map information for various geographical regions in the HD map store 165. The online HD map system 110 may be configured to include other modules than those illustrated in FIG. 1, for example, various other modules as illustrated in FIG. 4 and further described herein.

In the present disclosure, a module may include code and routines configured to enable a corresponding system (e.g., a corresponding computing system) to perform one or more of the operations described therewith. Additionally or alternatively, any given module may be implemented using hardware including any number of processors, microprocessors (e.g., to perform or control performance of one or more operations), field-programmable gate arrays (FPGAs), application-specific integrated circuits (ASICs) or any suitable combination of two or more thereof. Alternatively or additionally, any given module may be implemented using a combination of hardware and software. In the present disclosure, operations described as being performed by a module may include operations that the module may direct a corresponding system to perform.

Further, the differentiation and separation of different modules indicated in the present disclosure is to help with explanation of operations being performed and is not meant to be limiting. For example, depending on the implementation, the operations described with respect to two or more of the modules described in the present disclosure may be performed by what may be considered as a same module. Further, the operations of one or more of the modules may be divided among what may be considered one or more other modules or submodules depending on the implementation.

The online HD map system 110 may be configured to receive sensor data collected by sensors of a plurality of vehicles 150, for example, hundreds or thousands of cars. The sensor data may include any data that may be obtained by sensors of the vehicles that may be related to generation of HD maps. For example, the sensor data may include LIDAR data, captured images, etc. Additionally or alternatively, the sensor data may include information that may describe the current state of the vehicle 150, the location and motion parameters of the vehicles 150, etc.

The vehicles 150 may be configured to provide the sensor data 115 that may be captured while driving along various routes and to send it to the online HD map system 110. The online HD map system 110 may be configured to use the sensor data 115 received from the vehicles 150 to create and update HD maps describing the regions in which the vehicles 150 may be driving. The online HD map system 110 may be configured to build high definition maps based on the collective sensor data 115 that may be received from the vehicles 150 and to store the HD map information in the HD map store 165.

The online HD map system 110 may be configured to send HD map data to the vehicles 150 at the request of the vehicles 150.

For example, in instances in which a particular vehicle 150 is scheduled to drive along a route, the particular vehicle computing system 120 of the particular vehicle 150 may be configured to provide information describing the route being traveled to the online HD map system 110. In response, the online HD map system 110 may be configured to provide HD map data of HD maps related to the route (e.g., that represent the area that includes the route) that may facilitate navigation and driving along the route by the particular vehicle 150.

In an embodiment, the online HD map system 110 may be configured to send portions of the HD map data to the vehicles 150 in a compressed format so that the data transmitted may consume less bandwidth. The online HD map system 110 may be configured to receive from various vehicles 150, information describing the HD map data that may be stored at a local HD map store (e.g., the local HD map store 275 of FIG. 2) of the vehicles 150.

In some embodiments, the online HD map system 110 may determine that the particular vehicle 150 may not have certain portions of the HD map data stored locally in a local HD map store of the particular vehicle computing system 120 of the particular vehicle 150. In these or other embodiments, in response to such a determination, the online HD map system 110 may be configured to send a particular portion of the HD map data to the vehicle 150.

In some embodiments, the online HD map system 110 may determine that the particular vehicle 150 may have previously received HD map data with respect to the same geographic area as the particular portion of the HD map data. In these or other embodiments, the online HD map system 110 may determine that the particular portion of the HD map data may be an updated version of the previously received HD map data that was updated by the online HD map system 110 since the particular vehicle 150 last received the previous HD map data. In some embodiments, the online HD map system 110 may send an update for that portion of the HD map data that may be stored at the particular vehicle 150. This may allow the online HD map system 110 to reduce or minimize the amount of HD map data that may be communicated with the vehicle 150 and also to keep the HD map data stored locally in the vehicle updated on a regular basis.

The vehicle 150 may include vehicle sensors 105 (e.g., vehicle sensors 105a-d), vehicle controls 130 (e.g., vehicle controls 130a-d), and a vehicle computing system 120 (e.g., vehicle computer systems 120a-d). The vehicle sensors 105 may be configured to detect the surroundings of the vehicle 150. In these or other embodiments, the vehicle sensors 105 may detect information describing the current state of the vehicle 150, for example, information describing the location and motion parameters of the vehicle 150.

The vehicle sensors 105 may comprise a camera, a LIDAR sensor, a global navigation satellite system (GNSS) receiver, for example, a GPS navigation system, an inertial measurement unit (IMU), and others. The vehicle sensors 105 may include one or more cameras that may capture images of the surroundings of the vehicle. A LIDAR may survey the surroundings of the vehicle by measuring distance to a target by illuminating that target with a laser light pulses and measuring the reflected pulses. The GPS navigation system may determine the position of the vehicle 150 based on signals from satellites. The IMU may include an electronic device that may be configured to measure and report motion data of the vehicle 150 such as velocity, acceleration, direction of movement, speed, angular rate, and so on using a combination of accelerometers and gyroscopes or other measuring instruments.

The vehicle controls 130 may be configured to control the physical movement of the vehicle 150, for example, acceleration, direction change, starting, stopping, etc. The vehicle controls 130 may include the machinery for controlling the accelerator, brakes, steering wheel, etc. The vehicle computing system 120 may provide control signals to the vehicle controls 130 on a regular and/or continuous basis and may cause the vehicle 150 to drive along a selected route.

The vehicle computing system 120 may be configured to perform various tasks including processing data collected by the sensors as well as map data received from the online HD map system 110. The vehicle computing system 120 may also be configured to process data for sending to the online HD map system 110. An example of the vehicle computing system 120 is further illustrated in FIG. 2 and further described in connection with FIG. 2.

The interactions between the vehicle computing systems 120 and the online HD map system 110 may be performed via a network, for example, via the Internet. The network may be configured to enable communications between the vehicle computing systems 120 and the online HD map system 110. In some embodiments, the network may be configured to utilize standard communications technologies and/or protocols. The data exchanged over the network may be represented using technologies and/or formats including the hypertext markup language (HTML), the extensible markup language (XML), etc. In addition, all or some of links may be encrypted using conventional encryption technologies such as secure sockets layer (SSL), transport layer security (TLS), virtual private networks (VPNs), Internet Protocol security (IPsec), etc. In some embodiments, the entities may use custom and/or dedicated data communications technologies.

Vehicle Computing System

Figure 2:
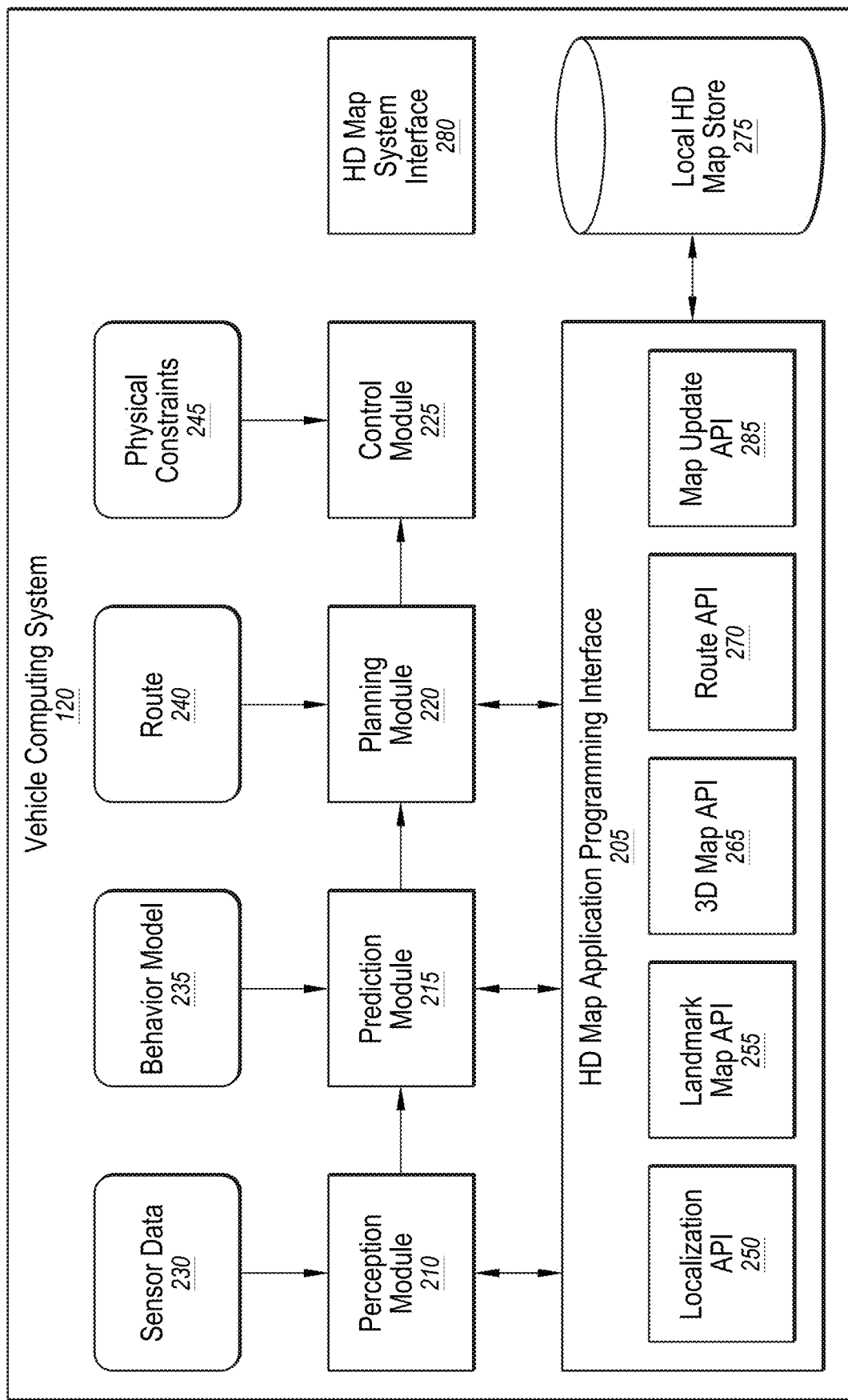
FIG. 2 illustrates an example system architecture of a vehicle computing system.

FIG. 2 illustrates an example system architecture of the vehicle computing system 120. The vehicle computing system 120 may include a perception module 210, a prediction module 215, a planning module 220, a control module 225, a local HD map store 275, an HD map system interface 280, and an HD map application programming interface (API) 205. The various modules of the vehicle computing system 120 may be configured to process various types of data including sensor data 230, a behavior model 235, routes 240, and physical constraints 245. In some embodiments, the vehicle computing system 120 may contain more or fewer modules. The functionality described as being implemented by a particular module may be implemented by other modules.

With reference to FIG. 2 and FIG. 1, in some embodiments, the vehicle computing system 120 may include a perception module 210. The perception module 210 may be configured to receive sensor data 230 from the vehicle sensors 105 of the vehicles 150. The sensor data 230 may include data collected by cameras of the car, LIDAR, IMU, GPS navigation system, radar devices, etc. The perception module 210 may also be configured to use the sensor data 230 to determine what objects are around the corresponding vehicle 150, the details of the road on which the corresponding vehicle 150 is travelling, etc. In addition, the perception module 210 may be configured to process the sensor data 230 to populate data structures storing the sensor data 230 and to provide the information or instructions to a prediction module 215 of the vehicle computing system 120.

The prediction module 215 may be configured to interpret the data provided by the perception module 210 using behavior models of the objects perceived to determine whether an object may be moving or likely to move. For example, the prediction module 215 may determine that objects representing road signs may not be likely to move, whereas objects identified as vehicles, people, etc., may either be in motion or likely to move. The prediction module 215 may also be configured to use behavior models 235 of various types of objects to determine whether they may be likely to move. In addition, the prediction module 215 may also be configured to provide the predictions of various objects to a planning module 200 of the vehicle computing system 120 to plan the subsequent actions that the corresponding vehicle 150 may take next.

The planning module 200 may be configured to receive information describing the surroundings of the corresponding vehicle 150 from the prediction module 215 and a route 240 that may indicate a destination of the vehicle 150 and that may indicate the path that the vehicle 150 may take to get to the destination.

The planning module 200 may also be configured to use the information from the prediction module 215 and the route 240 to plan a sequence of actions that the vehicle 150 may to take within a short time interval, for example, within the next few seconds. In some embodiments, the planning module 200 may be configured to specify a sequence of actions as one or more points representing nearby locations that the corresponding vehicle 150 may drive through next. The planning module 200 may be configured to provide, to the control module 225, the details of a plan comprising the sequence of actions to be taken by the corresponding vehicle 150. The plan may indicate the subsequent action or actions of the corresponding vehicle 150, for example, whether the corresponding vehicle 150 may perform a lane change, a turn, an acceleration by increasing the speed or slowing down, etc.

The control module 225 may be configured to determine the control signals that may be sent to the vehicle controls 130 of the corresponding vehicle 150 based on the plan that may be received from the planning module 200. For example, if the corresponding vehicle 150 is currently at point A and the plan specifies that the corresponding vehicle 150 should next proceed to a nearby point B, the control module 225 may determine the control signals for the vehicle controls 130 that may cause the corresponding vehicle 150 to go from point A to point B in a safe and smooth way, for example, without taking any sharp turns or a zig zag path from point A to point B. The path that may be taken by the corresponding vehicle 150 to go from point A to point B may depend on the current speed and direction of the corresponding vehicle 150 as well as the location of point B with respect to point A. For example, if the current speed of the corresponding vehicle 150 is high, the corresponding vehicle 150 may take a wider turn compared to another vehicle driving slowly.

The control module 225 may also be configured to receive physical constraints 245 as input. The physical constraints 245 may include the physical capabilities of the corresponding vehicle 150. For example, the corresponding vehicle 150 having a particular make and model may be able to safely make certain types of vehicle movements such as acceleration and turns that another vehicle with a different make and model may not be able to make safely. In addition, the control module 225 may be configured to incorporate the physical constraints 245 in determining the control signals for the vehicle controls 130 of the corresponding vehicle 150. In addition, the control module 225 may be configured to send control signals to the vehicle controls 130 that may cause the corresponding vehicle 150 to execute the specified sequence of actions and may cause the corresponding vehicle 150 to move according to a predetermined set of actions. In some embodiments, the aforementioned steps may be constantly repeated every few seconds and may cause the corresponding vehicle 150 to drive safely along the route that may have been planned for the corresponding vehicle 150.

The various modules of the vehicle computing system 120 including the perception module 210, prediction module 215, and planning module 220 may be configured to receive map information to perform their respective computations. The corresponding vehicle 150 may store the HD map data in the local HD map store 275. The modules of the vehicle computing system 120 may interact with the map data using an HD map API 205.

The HD map API 205 may provide one or more application programming interfaces (APIs) that can be invoked by a module for accessing the map information. The HD map system interface 280 may be configured to allow the vehicle computing system 120 to interact with the online HD map system 110 via a network (not illustrated in the Figures). The local HD map store 275 may store map data in a format that may be specified by the online HD map system 110. The HD map API 205 may be configured to process the map data format as provided by the online HD map system 110. The HD map API 205 may be configured to provide the vehicle computing system 120 with an interface for interacting with the HD map data. The HD map API 205 may include several APIs including a localization API 250, a landmark map API 255, a 3D map API 265, a route API 270, a map update API 285, etc.

The localization API 250 may be configured to determine the current location of the corresponding vehicle 150, for example, where the corresponding vehicle 150 is with respect to a given route. The localization API 250 may be configured to include a localized API that determines a location of the corresponding vehicle 150 within an HD map and within a particular degree of accuracy. The vehicle computing system 120 may also be configured to use the location as an accurate (e.g., within a certain level of accuracy) relative position for making other queries, for example, feature queries, navigable space queries, and occupancy map queries further described herein.

The localization API 250 may be configured to receive inputs comprising one or more of, location provided by GPS, vehicle motion data provided by IMU, LIDAR scanner data, camera images, etc. The localization API 250 may be configured to return an accurate location of the corresponding vehicle 150 as latitude and longitude coordinates. The coordinates that may be returned by the localization API 250 may be more accurate compared to the GPS coordinates used as input, for example, the output of the localization API 250 may have precision ranging within from 2-30 cm. In some embodiments, the vehicle computing system 120 may be configured to invoke the localization API 250 to determine the location of the corresponding vehicle 150 periodically based on the LIDAR using scanner data, for example, at a frequency of 10 Hertz (Hz).

The vehicle computing system 120 may also be configured to invoke the localization API 250 to determine the vehicle location at a higher rate (e.g., 60 Hz) if GPS or IMU data is available at that rate. In addition, vehicle computing system 120 may be configured to store as internal state, location history records to improve accuracy of subsequent localization calls. The location history record may store history of location from the point-in-time, when the corresponding vehicle 150 was turned off/stopped, etc. The localization API 250 may include a localize-route API that may be configured to generate an accurate (e.g., within a specified degree of accuracy) route specifying lanes based on the HD maps. The localize-route API may be configured to receive as input a route from a source to a destination via one or more third-party maps and may be configured to generate a high precision (e.g., within a specified degree of precision such as within 30 cm) route represented as a connected graph of navigable lanes along the input routes based on HD maps.

The landmark map API 255 may be configured to provide a geometric and semantic description of the world around the corresponding vehicle 150, for example, description of various portions of lanes that the corresponding vehicle 150 is currently travelling on. The landmark map APIs 255 comprise APIs that may be configured to allow queries based on landmark maps, for example, fetch-lanes API and fetch-features API. The fetch-lanes API may be configured to provide lane information relative to the corresponding vehicle 150 and the fetch-features API. The fetch-lanes API may also be configured to receive, as input, a location, for example, the location of the corresponding vehicle 150 specified using latitude and longitude and return lane information relative to the input location. In addition, the fetch-lanes API may be configured to specify a distance parameter indicating the distance relative to the input location for which the lane information may be retrieved. Further, the fetch-features API may be configured to receive information identifying one or more lane elements and to return landmark features relative to the specified lane elements. The landmark features may include, for each landmark, a spatial description that may be specific to the type of landmark.

The 3D map API 265 may be configured to provide access to the spatial 3-dimensional (3D) representation of the road and various physical objects around the road as stored in the local HD map store 275. The 3D map APIs 265 may include a fetch-navigable-surfaces API and a fetch-occupancy-grid API. The fetch-navigable-surfaces API may be configured to receive as input identifiers for one or more lane elements and return navigable boundaries for the specified lane elements. The fetch-occupancy-grid API may also be configured to receive a location as input, for example, a latitude and a longitude of the corresponding vehicle 150, and return information describing occupancy for the surface of the road and all objects available in the HD map near the location. The information describing occupancy may include a hierarchical volumetric grid of some or all positions considered occupied in the HD map. The occupancy grid may include information at a high resolution near the navigable areas, for example, at curbs and bumps, and relatively low resolution in less significant areas, for example, trees and walls beyond a curb. In addition, the fetch-occupancy-grid API may be configured to detect obstacles and to change direction, if necessary.

The 3D map APIs 265 may also include map-update APIs, for example, download-map-updates API and upload-map-updates API. The download-map-updates API may be configured to receive as input a planned route identifier and download map updates for data relevant to all planned routes or for a specific planned route. The upload-map-updates API may be configured to upload data collected by the vehicle computing system 120 to the online HD map system 110. The upload-map-updates API may allow the online HD map system 110 to keep the HD map data stored in the online HD map system 110 up to date based on changes in map data that may be observed by sensors of vehicles 150 driving along various routes.

The route API 270 may be configured to return route information including a full route between a source and destination and portions of a route as the corresponding vehicle 150 travels along the route. The 3D map API 265 may be configured to allow querying of the online HD map system 110. The route APIs 270 may include an add-planned-routes API and a get-planned-route API. The add-planned-routes API may be configured to provide information describing planned routes to the online HD map system 110 so that information describing relevant HD maps may be downloaded by the vehicle computing system 120 and kept up to date. The add-planned-routes API may be configured to receive as input, a route specified using polylines expressed in terms of latitudes and longitudes and also a time-to-live (TTL) parameter specifying a time period after which the route data may be deleted. Accordingly, the add-planned-routes API may be configured to allow the vehicle 150 to indicate the route the vehicle 150 is planning on taking in the near future as an autonomous trip. The add-planned-route API may also be configured to align the route to the HD map, record the route and its TTL value, and determine that the HD map data for the route stored in the vehicle computing system 120 is up to date. The get-planned-routes API may be configured to return a list of planned routes and to provide information describing a route identified by a route identifier.

The map update API 285 may be configured to manage operations related to updating of map data, both for the local HD map store 275 and for the HD map store 165 stored in the online HD map system 110. Accordingly, modules in the vehicle computing system 120 may be configured to invoke the map update API 285 for downloading data from the online HD map system 110 to the vehicle computing system 120 for storing in the local HD map store 275. The map update API 285 may also be configured to allow the vehicle computing system 120 to determine whether the information monitored by the vehicle sensors 105 indicates a discrepancy in the map information provided by the online HD map system 110 and upload data to the online HD map system 110 that may result in the online HD map system 110 updating the map data stored in the HD map store 165 that is provided to other vehicles 150.

Figure 3:
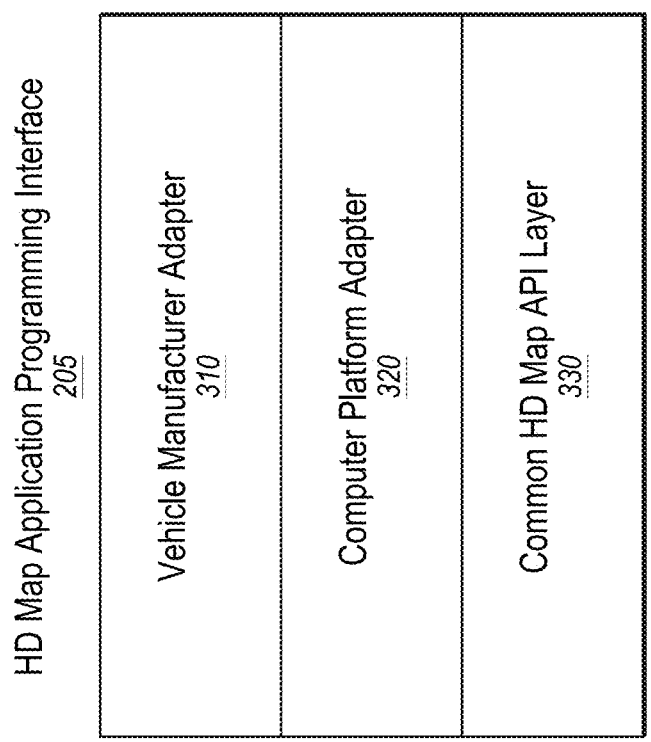
FIG. 3 illustrates an example of various layers of instructions in an HD map application programming interface of a vehicle computing system.

FIG. 3 illustrates an example of various layers of instructions in the HD map API 205 of the vehicle computing system 120. Different manufacturers of vehicles may have different procedures or instructions for receiving information from vehicle sensors 105 and for controlling the vehicle controls 130. Furthermore, different vendors may provide different computer platforms with autonomous driving capabilities, for example, collection and analysis of vehicle sensor data. Examples of a computer platform for autonomous vehicles include platforms provided vendors, such as NVIDIA, QUALCOMM, and INTEL. These platforms may provide functionality for use by autonomous vehicle manufacturers in the manufacture of vehicles 150. A vehicle manufacturer may use any one or several computer platforms for vehicles 150.

The online HD map system 110 may be configured to provide a library for processing HD maps based on instructions specific to the manufacturer of the vehicle and instructions specific to a vendor specific platform of the vehicle. The library may provide access to the HD map data and may allow the vehicle 150 to interact with the online HD map system 110.

As illustrated in FIG. 3, the HD map API 205 may be configured to be implemented as a library that includes a vehicle manufacturer adapter 310, a computer platform adapter 320, and a common HD map API layer 330. The common HD map API layer 330 may be configured to include generic instructions that may be used across a plurality of vehicle computer platforms and vehicle manufacturers. The computer platform adapter 320 may be configured to include instructions that may be specific to each computer platform. For example, the common HD map API layer 330 may be configured to invoke the computer platform adapter 320 to receive data from sensors supported by a specific computer platform. The vehicle manufacturer adapter 310 may be configured to include instructions specific to a vehicle manufacturer. For example, the common HD map API layer 330 may be configured to invoke functionality provided by the vehicle manufacturer adapter 310 to send specific control instructions to the vehicle controls 130.

The online HD map system 110 may be configured to store computer platform adapters 320 for a plurality of computer platforms and vehicle manufacturer adapters 310 for a plurality of vehicle manufacturers. The online HD map system 110 may be configured to determine the particular vehicle manufacturer and the particular computer platform for a specific vehicle 150. The online HD map system 110 may also be configured to select the vehicle manufacturer adapter 310 for the particular vehicle manufacturer and the computer platform adapter 320 the particular computer platform of a specific vehicle. In addition, the online HD map system 110 may be configured to send instructions of the selected vehicle manufacturer adapter 310 and the selected computer platform adapter 320 to the vehicle computing system 120 of that specific vehicle. The vehicle computing system 120 of that specific vehicle may be configured to install the received vehicle manufacturer adapter 310 and the computer platform adapter 320. The vehicle computing system 120 may also be configured to periodically verify whether the online HD map system 110 has an update to the installed vehicle manufacturer adapter 310 and the computer platform adapter 320. In addition, if a more recent update is available compared to the version installed on the vehicle 150, the vehicle computing system 120 may be configured to request and receive the latest update and to install it.

HD Map System Architecture

FIG. 4 illustrates an example system architecture of the online HD map system 110. The online HD map system 110 may be configured to include a map creation module 410, a map update module 420, a map data encoding module 430, a load balancing module 440, a map accuracy management module 450, the vehicle interface module 160, and the HD map store 165. Some embodiments of online HD map system 110 may be configured to include more or fewer modules than shown in FIG. 4. Functionality indicated as being performed by a particular module may be implemented by other modules. In some embodiments, the online HD map system 110 may be configured to be a distributed system comprising a plurality of processing systems.

The map creation module 410 may be configured to create HD map data of HD maps from the sensor data collected from several vehicles 150 that are driving along various routes. The map update module 420 may be configured to update previously computed HD map data by receiving more recent information (e.g., sensor data) from vehicles 150 that recently traveled along routes on which map information changed. For example, certain road signs may have changed or lane information may have changed as a result of construction in a region, and the map update module 420 may be configured to update the HD maps and corresponding HD map data accordingly. The map data encoding module 430 may be configured to encode the HD map data to be able to store the data efficiently (e.g., compress the HD map data) as well as send the HD map data to vehicles 150. The load balancing module 440 may be configured to balance loads across vehicles 150 such that requests to receive data from vehicles 150 are distributed across various vehicles 150 in a relatively uniform manner (e.g., the load distribution between different vehicles 150 is within a threshold amount of each other). The map accuracy management module 450 may be configured to maintain relatively high accuracy of the HD map data using various techniques even though the information received from individual vehicles may not have the same degree of accuracy.

Figure 5:
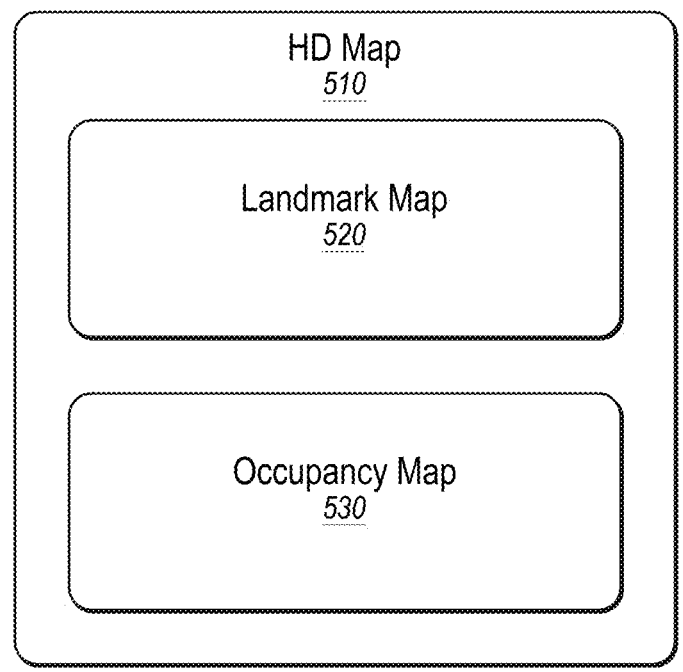
FIG. 5 illustrates example components of an HD map.

FIG. 5 illustrates example components of an HD map 510. The HD map 510 may include HD map data of maps of several geographical regions. In the present disclosure, reference to a map or an HD map, such as HD map 510, may include reference to the map data that corresponds to such map. Further, reference to information of a respective map may also include reference to the map data of that map.

In some embodiments, the HD map 510 of a geographical region may include a landmark map (LMap) 520 and an occupancy map (OMap) 530. The landmark map 520 may comprise information describing lanes including spatial location of lanes and semantic information about each lane. The spatial location of a lane may comprise the geometric location in latitude, longitude, and elevation at high prevision, for example, precision within 30 cm or better. The semantic information of a lane comprises restrictions such as direction, speed, type of lane (for example, a lane for going straight, a left turn lane, a right turn lane, an exit lane, and the like), restriction on crossing to the left, connectivity to other lanes, etc.

In these or other embodiments, the landmark map 520 may comprise information describing stop lines, yield lines, spatial location of cross walks, safely navigable space, spatial location of speed bumps, curb, road signs comprising spatial location, type of all signage that is relevant to driving restrictions, etc. Examples of road signs described in an HD map 510 may include stop signs, traffic lights, speed limits, one-way, do-not-enter, yield (vehicle, pedestrian, animal), etc.

In some embodiments, the occupancy map 530 may comprise a spatial 3-dimensional (3D) representation of the road and physical objects around the road. The data stored in an occupancy map 530 may also be referred to herein as occupancy grid data. The 3D representation may be associated with a confidence score indicative of a likelihood of the object existing at the location. The occupancy map 530 may be represented in a number of other ways. In some embodiments, the occupancy map 530 may be represented as a 3D mesh geometry (collection of triangles) which may cover the surfaces. In some embodiments, the occupancy map 530 may be represented as a collection of 3D points which may cover the surfaces. In some embodiments, the occupancy map 530 may be represented using a 3D volumetric grid of cells at 5-10 cm resolution. Each cell may indicate whether or not a surface exists at that cell, and if the surface exists, a direction along which the surface may be oriented.

The occupancy map 530 may take a large amount of storage space compared to a landmark map 520. For example, data of 1 GB/Mile may be used by an occupancy map 530, resulting in the map of the United States (including 4 million miles of road) occupying $4 \times 10^{15}$ bytes or 4 petabytes. Therefore, the online HD map system 110 and the vehicle computing system 120 may use data compression techniques to be able to store and transfer map data thereby reducing storage and transmission costs. Accordingly, the techniques disclosed herein may help improve the self-driving of vehicles by improving the efficiency of data storage and transmission with respect to self-driving operations and capabilities.

In some embodiments, the HD map 510 does may not use or rely on data that may typically be included in maps, such as addresses, road names, ability to geo-code an address, and ability to compute routes between place names or addresses. The vehicle computing system 120 or the online HD map system 110 may access other map systems, for example, GOOGLE MAPS, to obtain this information. Accordingly, a vehicle computing system 120 or the online HD map system 110 may receive navigation instructions from a tool such as GOOGLE MAPS into a route and may convert the information to a route based on the HD map 510 or may convert the information such that it may be compatible for us on the HD map 510.

Geographical Regions in HD Maps

The online HD map system 110 may divide a large physical area into geographical regions and may store a representation of each geographical region. Each geographical region may represent a contiguous area bounded by a geometric shape, for example, a rectangle or square. In some embodiments, the online HD map system 110 may divide a physical area into geographical regions of similar size independent of the amount of data needed to store the representation of each geographical region. In some embodiments, the online HD map system 110 may divide a physical area into geographical regions of different sizes, where the size of each geographical region may be determined based on the amount of information needed for representing the geographical region. For example, a geographical region representing a densely populated area with a large number of streets may represent a smaller physical area compared to a geographical region representing sparsely populated area with very few streets. In some embodiments, the online HD map system 110 may determine the size of a geographical region based on an estimate of an amount of information that may be used to store the various elements of the physical area relevant for the HD map.

In some embodiments, the online HD map system 110 may represent a geographic region using an object or a data record that may include various attributes including: a unique identifier for the geographical region; a unique name for the geographical region; a description of the boundary of the geographical region, for example, using a bounding box of latitude and longitude coordinates; and a collection of landmark features and occupancy grid data.

Figure 6A:
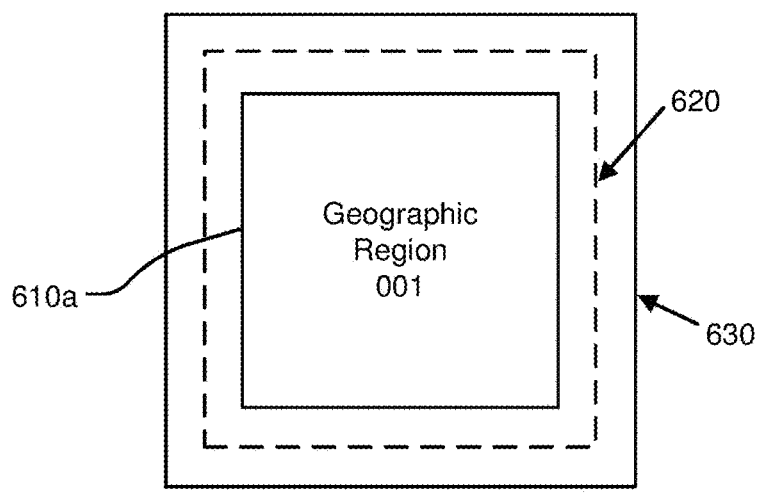
FIGS. 6A-6B illustrate example geographical regions defined in an HD map.
Figure 6B:
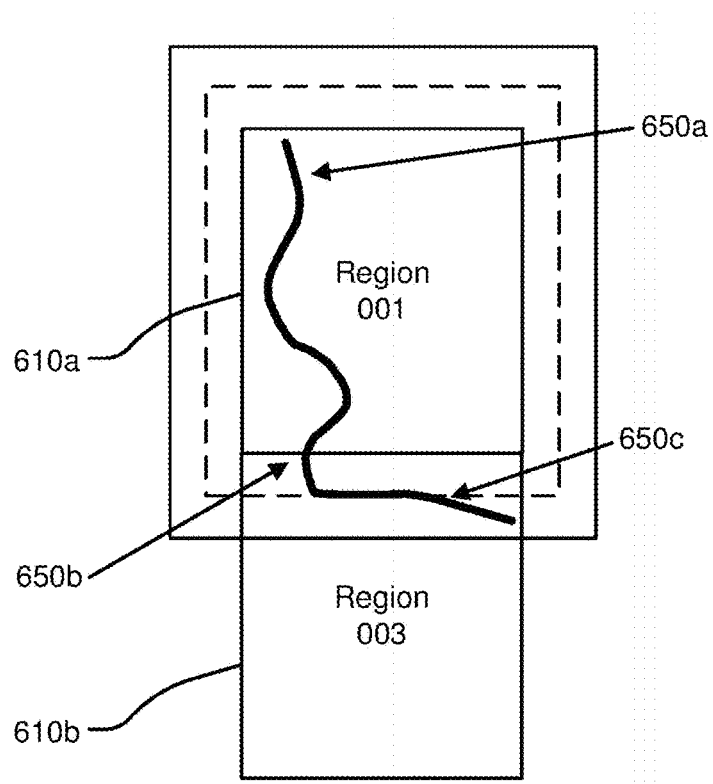

FIGS. 6A-6B illustrate example geographical regions 610a and 610b that may be defined in an HD map according to one or more embodiments. FIG. 6A illustrates a geographical region 610a. FIG. 6B illustrates two neighboring geographical regions 610a and 610b. The online HD map system 110 may store data in a representation of a geographical region that may allow for transitions from one geographical region to another as a vehicle 150 drives across geographical region boundaries.

In some embodiments, as illustrated in FIG. 6, each geographic region may include a buffer of a predetermined width around it. The buffer may comprise redundant map data around one or more sides e of a geographic region. In these or other embodiments, the buffer may be around every side of a particular geographic region. Therefore, in some embodiments, where the geographic region may be a certain shape, the geographic region may be bounded by a buffer that may be a larger version of that shape. By way of example, FIG. 6A illustrates a boundary 620 for a buffer of approximately 50 m around the geographic region 610a and a boundary 630 for a buffer of approximately 100 m around the geographic region 610a.

In some embodiments, the vehicle computing system 120 may switch the current geographical region of the corresponding vehicle 150 from one geographical region to a neighboring geographical region when the corresponding vehicle 150 crosses a predetermined threshold distance within the buffer. For example, as shown in FIG. 6B, the corresponding vehicle 150 may start at location 650a in the geographical region 610a. The corresponding vehicle 150 may traverse along a route to reach a location 650b where it may cross the boundary of the geographical region 610 but may stay within the boundary 620 of the buffer. Accordingly, the vehicle computing system 120 of the corresponding vehicle 150 may continue to use the geographical region 610a as the current geographical region of the vehicle. Once the corresponding vehicle 150 crosses the boundary 620 of the buffer at location 650c, the vehicle computing system 120 may switch the current geographical region of the corresponding vehicle 150 to geographical region 610b from geographical region 610a. The use of a buffer may reduce or prevent rapid switching of the current geographical region of a vehicle 150 as a result of the vehicle 150 travelling along a route that may closely track a boundary of a geographical region.

Lane Representations in HD Maps

The HD map system 100 may represent lane information of streets in HD maps. Although the embodiments described may refer to streets, the techniques may be applicable to highways, alleys, avenues, boulevards, paths, etc., on which vehicles 150 may travel. The HD map system 100 may use lanes as a reference frame for purposes of routing and for localization of the vehicle 150. The lanes represented by the HD map system 100 may include lanes that are explicitly marked, for example, white and yellow striped lanes, lanes that may be implicit, for example, on a country road with no lines or curbs but may nevertheless have two directions of travel, and implicit paths that may act as lanes, for example, the path that a turning car may make when entering a lane from another lane.

The HD map system 100 may also store information relative to lanes, for example, landmark features such as road signs and traffic lights relative to the lanes, occupancy grids relative to the lanes for obstacle detection, and navigable spaces relative to the lanes so the vehicle 150 may plan/react in emergencies when the vehicle 150 makes an unplanned move out of the lane. Accordingly, the HD map system 100 may store a representation of a network of lanes to allow the vehicle 150 to plan a legal path between a source and a destination and to add a frame of reference for real-time sensing and control of the vehicle 150. The HD map system 100 stores information and provides APIs that may allow a vehicle 150 to determine the lane that the vehicle 150 is currently in, the precise location of the vehicle 150 relative to the lane geometry, and other relevant features/data relative to the lane and adjoining and connected lanes.

Figure 7:
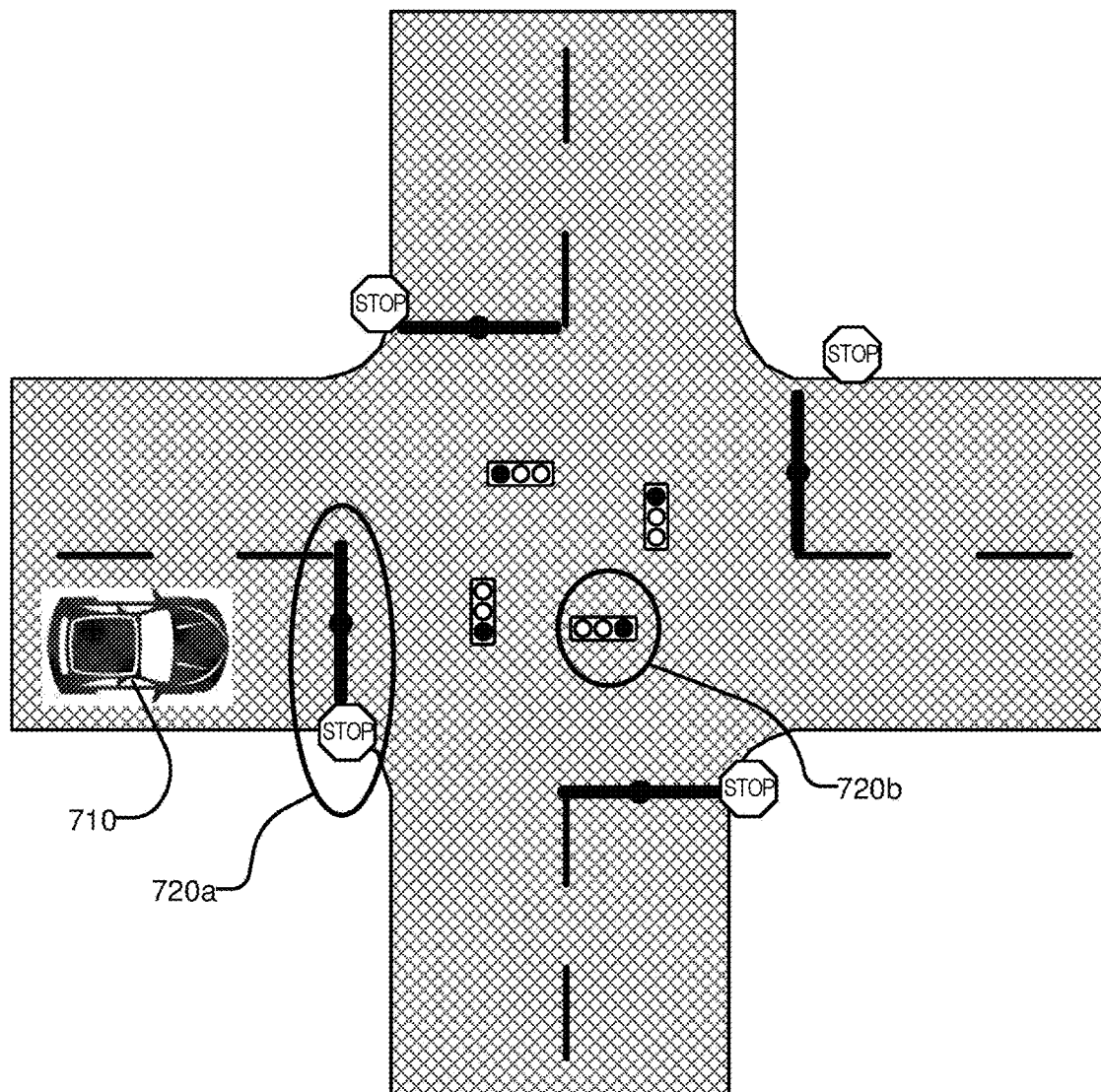
FIG. 7 illustrates example representations of lanes in an HD map.

FIG. 7 illustrates example lane representations in an HD map. FIG. 7 illustrates a vehicle 710 at a traffic intersection. The HD map system 100 provides the vehicle 710 with access to the map data that may be relevant for autonomous driving of the vehicle 710. This may include, for example, features 720a and 720b that may be associated with the lane but may not be the closest features to the vehicle 710. Therefore, the HD map system 100 may store a lane-centric representation of data that may represent the relationship of the lane to the feature so that the vehicle 710 can efficiently extract the features given a lane.

The HD map data may represent portions of the lanes as lane elements. The lane elements may specify the boundaries of the lane and various constraints including the legal direction in which a vehicle may travel within the lane element, the speed with which the vehicle may drive within the lane element, whether the lane element may be for left turn only, or right turn only, etc. In some embodiments, the HD map data may represent a lane element as a continuous geometric portion of a single vehicle lane. The HD map system 100 may store objects or data structures that may represents lane elements that may comprise information representing geometric boundaries of the lanes; driving direction along the lane; vehicle restriction for driving in the lane, for example, speed limit, relationships with connecting lanes including incoming and outgoing lanes; a termination restriction, for example, whether the lane ends at a stop line, a yield sign, or a speed bump; and relationships with road features that are relevant for autonomous driving, for example, traffic light locations, road sign locations, etc. as part of the HD map data.

Examples of lane elements represented by the HD map data may include, a piece of a right lane on a freeway, a piece of a lane on a road, a left turn lane, the turn from a left turn lane into another lane, a merge lane from an on-ramp an exit lane on an off-ramp, and a driveway. The HD map data may represent a one-lane road using two lane elements, one for each direction. The HD map system 100 may represents median turn lanes that may be shared similar to a one-lane road.

Figure 8A:
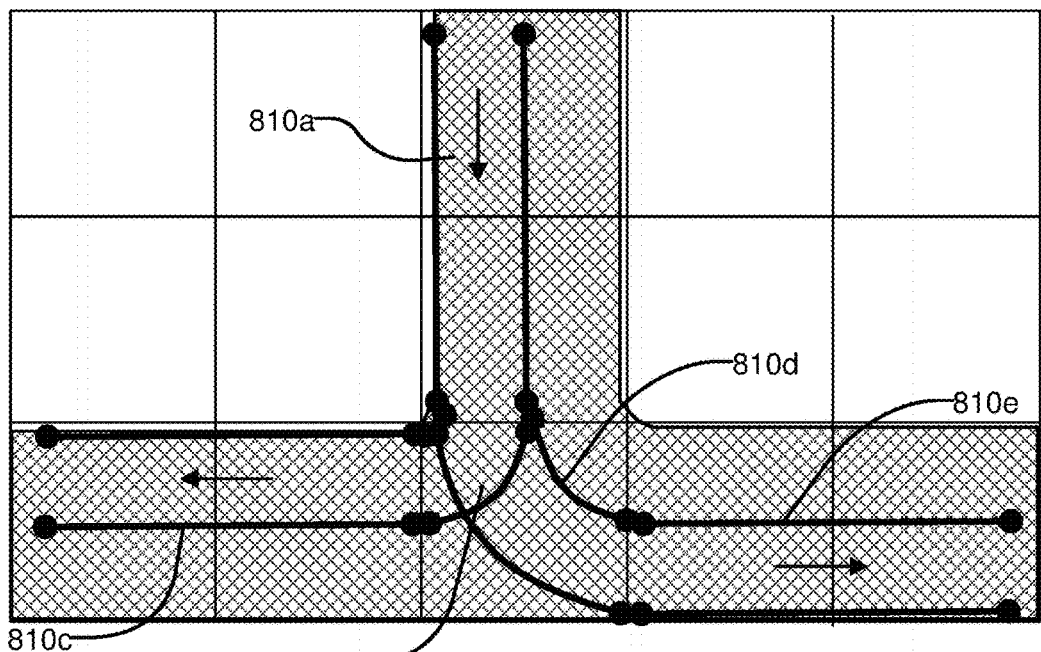
FIGS. 8A-8B illustrate example lane elements and relationships between lane elements in an HD map.
Figure 8B:
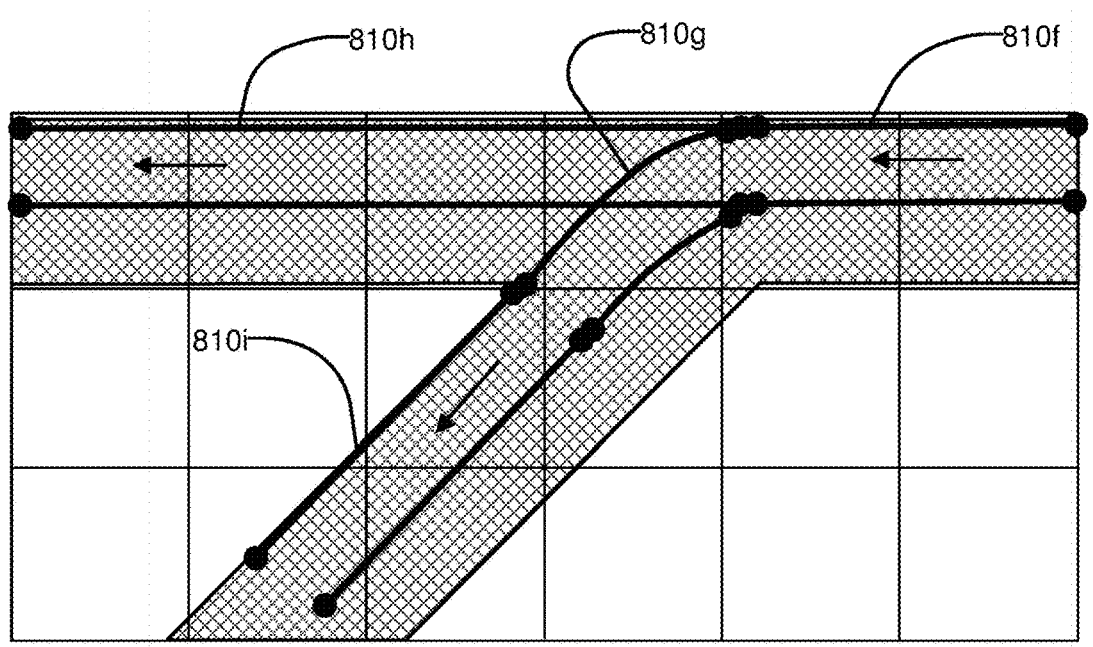

FIGS. 8A-B illustrate lane elements and relations between lane elements in an HD map. FIG. 8A illustrates an example of a T-junction in a road illustrating a lane element 810a that may be connected to lane element 810c via a turn lane 810b and may be connected to lane 810e via a turn lane 810d. FIG. 8B illustrates an example of a Y-junction in a road illustrating label 810f that may be connected to lane 810h directly and may be connected to lane 810*i* via lane 810*g*. The HD map system 100 may determine a route from a source location to a destination location as a sequence of connected lane elements that may be traversed to reach from the source location to the destination location.

Image Keypoint Generation

Figure 9A:
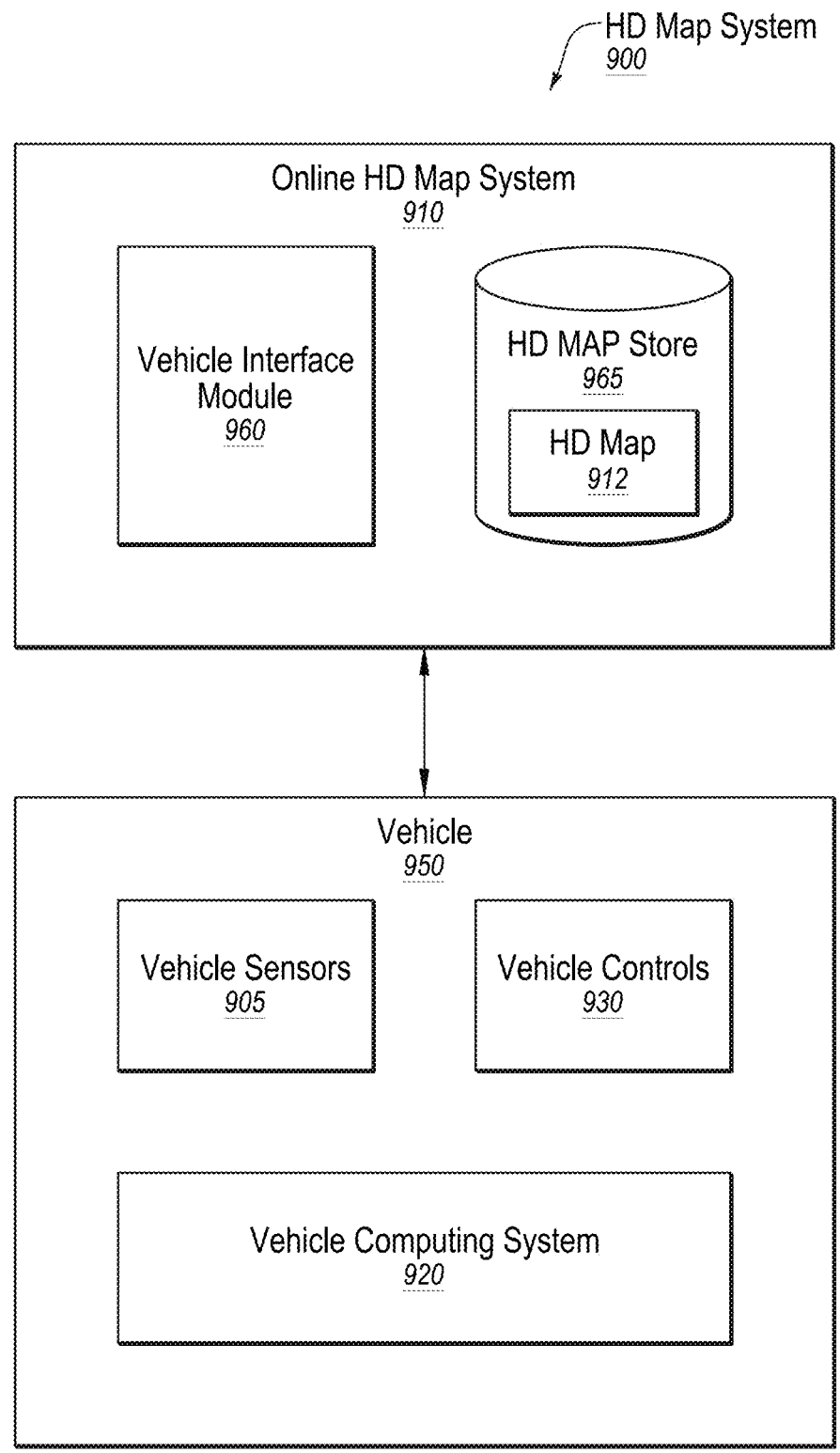
FIGS. 9A-9B illustrate an example system configured to improve the alignment of a vehicle with respect to lanes, roads, other vehicles, landmarks, etc. using sensor data captured by one or more cameras of the vehicle.

FIG. 9A illustrates an example system 900 configured to generate image keypoints, according to one or more embodiments of the present disclosure. The system 900 may also be configured to use the image-based map annotations to perform image-based localization as discussed in detail below. The system 900 may be analogous to the HD map system 100 of FIG. 1. The system 900 may include an online HD map system 910, vehicle interface module 960, and a HD map store 965, which may be analogous to the online HD map system 110, vehicle interface module 160, and a HD map store 165, respectively of FIG. 1.

The system 900 may also include the vehicle 950, which may be analogous to one of the vehicles 150 of FIG. 1. The vehicle 950 may also include vehicle sensors 905, a vehicle computing system 920 ("computing system 920"), and vehicle controls 930, which may be analogous to the vehicle sensors 105, vehicle computing system 120, and vehicle controls 130, respectively, of FIG. 1. In the present disclosure, reference to the system 900 performing operations may include any applicable element of the system 900 performing such operations.

The system 900 (e.g., via the online HD map system 910 and/or the vehicle computing system 920) may be configured to generate one or more three-dimensional image keypoints ("3D keypoints"). The 3D keypoints may correspond to features of points of interest (e.g., certain objects) in a region and may be derived from images of the region. As detailed below, the system 900 may be configured to use LIDAR scans to generate the 3D keypoints and identify their respective locations in the region. The use of the LIDAR scans to perform such operations may improve the accuracy of the 3D keypoints and their associated locations.

In some embodiments, the system 900 may be configured to annotate map data of an HD map 912 with keypoint data that corresponds to the 3D keypoints. The HD map 912 and corresponding HD map data may be stored in the HD map store 965. Additionally, the HD map 912 and corresponding HD map data may be communicated to the vehicle 950 via the online HD map system 910 such that the HD map 912 and the corresponding HD map data may be stored locally in data storage or memory of the computing system 920. The HD map 912 and corresponding HD map data stored locally in the computing system 920 may be a subset of the HD map 912 and corresponding HD map data stored in the HD map store 965.

Figure 9B:
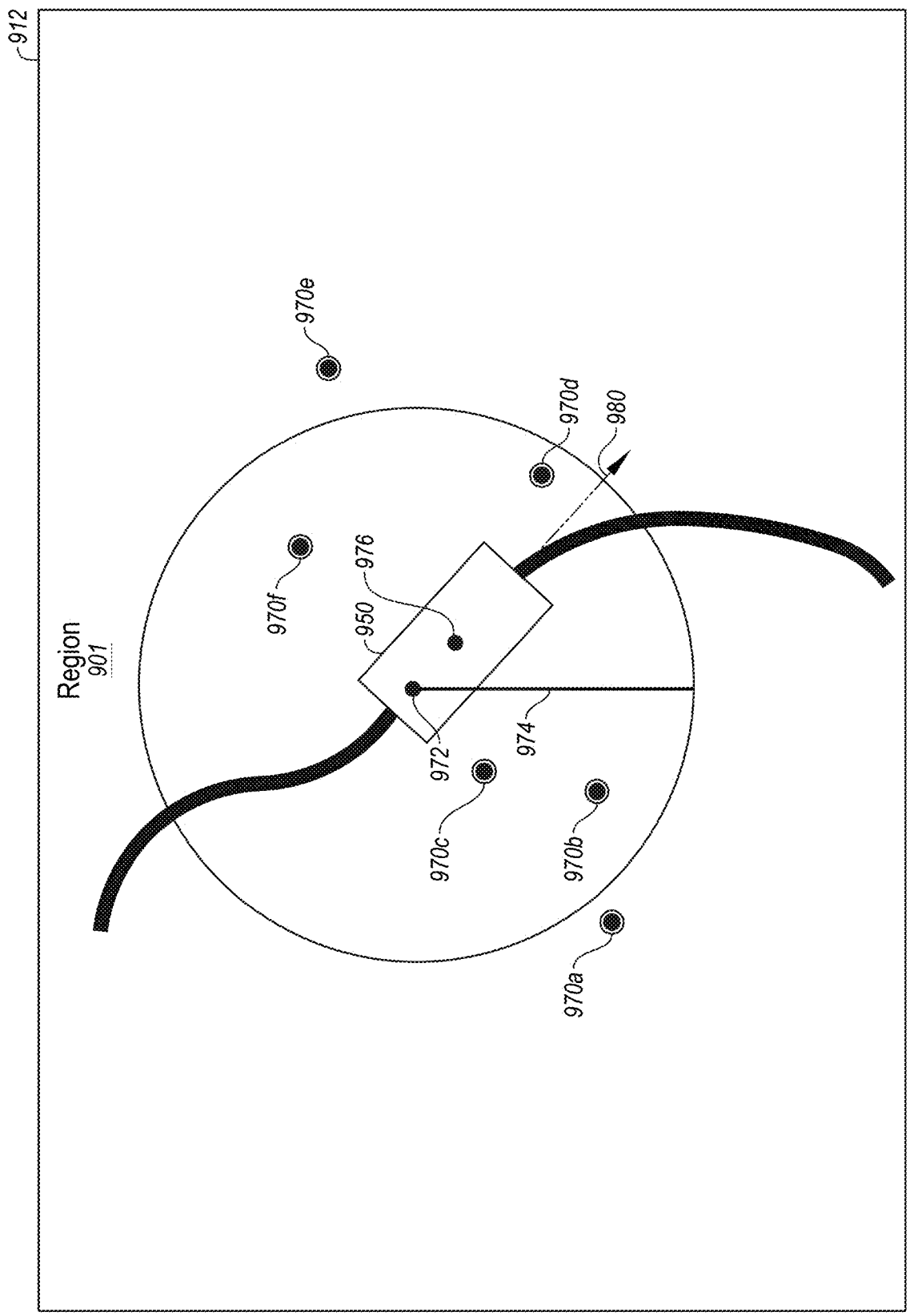

In some embodiments, the system 900 may be configured to annotate the HD map 912 with data that identifies locations of respective areas within the HD map 912 that may correspond to 3D keypoints. FIG. 9B illustrates an example of a region 901 represented by the HD map 912 that may include such annotations.

For example, the HD map 912 may include HD map data that identifies the location of each of one or more 3D keypoints for the region 901, for example 3D keypoints 970*a*-970*f* (referred to collectively or generically as "keypoints 970"). In some instances, the keypoints 970 may each respectively correspond to a respective feature in the region 901 that may be of interest with respect to visual localization. The system 900 may be configured to generate the keypoints 970 as follows below.

In some embodiments, the system 900 may obtain a plurality of LIDAR scans of a region. The LIDAR scans may be obtained by one or more vehicles that have traveled in the region 901 and that have used LIDAR to scan the region 901 while travelling therewithin. In some embodiments, the LIDAR scans may be obtained in real-time while the corresponding vehicle is traveling. Additionally or alternatively, the LIDAR scans may be obtained from map data of the HD map 912 that has been generated based on the LIDAR scans.

The system 900 may be configured to identify identify a plurality of LIDAR poses in which each LIDAR pose corresponds to a respective LIDAR scan of the plurality of LIDAR scans. The LIDAR poses may may refer to an alignment, orientation, location, etc. of a LIDAR scanner and/or the vehicle on which the LIDAR scanner may be disposed when scanning an area. In instances in which the LIDAR scans are obtained from the HD map data, the corresponding LIDAR poses may also be stored with the HD map data and may be obtained therefrom. Additionally or alternatively, localization may be performed (e.g., using the LIDAR scans and map data of the HD map) to determine the LIDAR poses. In these or other embodiments, the LIDAR poses may be given with respect to a global frame of reference of the HD map 912. Additionally or alternatively, the LIDAR poses may be obtained by comparing different LIDAR scans and using an identified trajectory of the vehicle (e.g., the vehicle 950). In these or other embodiments, the LIDAR poses may be with respect to a relative frame of reference with respect to the corresponding LIDAR scans.

The system 900 may be configured to identify images that may correspond to the LIDAR scans. For example, while driving through the region 901 and obtaining LIDAR scans, the vehicle that is obtaining the LIDAR scans may also capture images of the region 901 using one or more cameras. These captured images may thus correspond to the LIDAR scans. The identified images may be referred to as "keyframes."

In some embodiments, the system 900 may select as keyframes camera images captured with respect to camera poses that are at a given distance interval apart from each other. The camera poses may indicate an alignment, orientation, location, etc. of a camera and/or the vehicle on which the camera may be disposed when capturing the corresponding image. Reference to a distance between images or keyframes in the present disclosure may refer to distances between camera poses that correspond to the images or keyframes. In some embodiments, one or more of the images may be closer to each other than a determined minimum distance and the system 900 may filter and/or remove the images from selection as keyframes such that the distance between the keyframes may be greater than the threshold distance.

In some embodiments, the system 900 may determine and/or identify two dimensional (2D) keypoints within the keyframes. For example, the system 900 may be configured to identify one or more objects in the keyframes and extract one or more points of interest from the one or more objects.

For example, point of interests may be identified based on pixels or sets of pixels within an image that may differ in their intensity by more than a predetermined value from other pixels or other sets of pixels of the image that may be adjacent to or near the pixel or set of pixels. Additionally or alternatively, the points of interest may be identified as features that may be distinguishable from other portions of the image due to differing color, size, and/or shape; areas where transitions may occur between pixels, features, and/or textures; features and/or objects with particular pattern or texture; points, areas, regions, etc. of high intensity within the image; points, areas, or regions with semantics within the image, etc. In some embodiments, the system 900 may identify as 2D keypoints the points of interest such that the 2D keypoints may correspond to features that correspond to the points of interest.

In some embodiments, the system 900 may identify and/or store information describing the 2D keypoints based on the points of interest including, but not limited to features, descriptors, etc. For example, in some embodiments, the system 900 (e.g., via the computing system of the online HD map system 910) may identify an object in a keypframe and may extract points of interest from or on the object. In these or other embodiments, the system 900 may be configured to identify features of the points of interest and to provide a feature description of the object. In some embodiments, the feature description may be extracted from a training image and may be used to identify the object when attempting to locate the object in a new image that may contain various other objects. As indicated above, in some embodiments, system may identify the 2D keypoints from or on high-contrast areas of the image, such as object edges.

In some embodiments, the system 900 may select a subset of the 2D keypoints based on 2D keypoints that are included in multiple of the keyframes. For example, the system 900 may identify multiple 2D keypoints in multiple keyframes that may each be associated with the same feature in the region 901. In some embodiments, the same feature may be captured in images from various angles. For example, features may be included in images captured by different cameras from various angles, from various lanes, from various directions, at various heights, etc. As a result, there may be multiple keyframes that may display the same features and thus may include the same 2D keypoints. In some embodiments, the system 900 may identify the subset of 2D keypoints based on inclusion of the same 2D keypoints in multiple keyframes.

For example, the system 900 may match 2D keypoints between neighboring keyframes. In some embodiments, the matching may be based on identifying common features between multiple keyframes in which the common features correspond to respective 2D keypoints of the respective keyframes. In these or other embodiments, the system 900 may determine match values between 2D keypoints and may identify as matching 2D keypoints those 2D keypoints with match values that satisfy a particular threshold. Additionally or alternatively, the system 900 may reject as matches those 2D keypoints that have a first-second best match ratio that is less than a threshold (e.g., less than 1).

Those 2D keypoints that are identified as matches may be selected for inclusion in the subset of keypoints. Additionally or alternatively, those 2D keypoints that are not identified as matches may be excluded from the subset of 2D keypoints in some embodiments. In these or other embodiments, those matching 2D keypoints that match in multiple of the keyframes may be selected for inclusion in the subset of 2D keypoints. Additionally or alternatively, the 2D keypoints that match in a threshold number of keyframes may be selected for inclusion in the subset of 2D keypoints.

In these or other embodiments, the system 900 may perform matching both ways between different keyframes. For example, the system 900 may perform matching from a first keyframe to a second keyframe and then back from the second keyframe to the first keyframe. Those 2D keypoints that are identified as matches in both matching directions may be selected for inclusion in the subset of 2D keypoints. Additionally or alternatively, those 2D keypoints that are not identified as matches in both matching directions may be excluded from the subset of 2D keypoints in some embodiments.

In some embodiments, the system 900 may determine correspondences between the 2D keypoints and LIDAR points of the LIDAR scans associated with the keyframes. In these or other embodiments, the system 900 may be configured to determine the subset of 2D keypoints based on the determined correspondences.

For example, the system 900 may be configured to identify LIDAR points in the LIDAR scans that correspond to the 2D keypoints. LIDAR points in the LIDAR scans that correspond to the same features as the 2D keypoints may be those LIDAR points that correspond to the 2D keypoints. In some embodiments, 2D keypoints that are identifiable as corresponding to LIDAR points may be included in the subset. Additionally or alternatively, LIDAR points that correspond to matching 2D keypoints that are identified as matching may also be compared. In response to the corresponding LIDAR points being the same or being within a particular distance of each other, the particular matching 2D keypoints may be selected for inclusion in the subset of 2D keypoints. In these or other embodiments, in response to the corresponding LIDAR points not being the same or not being within the particular distance of each other, the particular matching 2D keypoints may be rejected for inclusion in the subset of keypoints.

In some embodiments, the selected 2D keypoints may be used to generate respective 3D keypoints. For example, matching 2D keypoints that correspond to a same particular feature may be used to generate a corresponding 3D keypoint that corresponds to the particular feature. The 2D keypoints may comprise a 2D representation of the particular feature and the corresponding 3D keypoint may comprise a 3D representation of the particular feature. The generation of the 3D keypoints based on the 2D keypoints may be performed using any suitable technique, such as a triangulation technique.

In some embodiments, the system 900 may determine correspondences between the 3D keypoints and LIDAR points of the LIDAR scans associated with the keyframes. In these or other embodiments, the system 900 may be configured to filter the 3D keypoints based on the determined correspondences. For example, the system 900 may be configured to identify LIDAR points in the LIDAR scans that correspond to the 3D keypoints. LIDAR points in the LIDAR scans that correspond to the same features as the 3D keypoints may be those LIDAR points that correspond to the 3D keypoints. In some embodiments, 3D keypoints that are identifiable as corresponding to LIDAR points may be kept as part of the filtering.

In these or other embodiments, the system 900 may filter the 3D keypoints based on one or more semantics of the 3D keypoints that may indicate characteristics of the corresponding features or objects of the 3D keypoints. For example, some characteristics of the features of the 3D keypoints may be more beneficial than others for certain applications, such as localization based on the 3D keypoints. For instance, relatively smooth and uniform surfaces such as of a pole may be more useful for image based localization than a bush. Therefore, in some embodiments, the 3D keypoints may be filtered according to identified semantics and the corresponding features thereof. In the present disclosure, reference to characteristics of 3D keypoints may refer to the characteristics of the features or objects that correspond to the 3D keypoints.

In these or other embodiments, the characteristics of the 3D keypoints may be determined based on the LIDAR points that correspond to the 3D keypoints. For example, the LIDAR points that correspond to a particular 3D keypoint and surrounding LIDAR points within a particular radius of the corresponding LIDAR points may be evaluated to determine the characteristics of the objects or features that correspond to such LIDAR points. LIDAR points that are relatively consistent with each other may indicate smooth surfaces or similar characteristics that may be beneficial. Accordingly, in some embodiments, 3D keypoints that correspond to LIDAR points and surrounding LIDAR points with determined smooth characteristics may be kept. Conversely, neighboring LIDAR points that have inconsistencies with respect to each other may indicate relatively rough or fuzzy surfaces, which may not be as useful. Accordingly, in some embodiments, 3D keypoints that correspond to LIDAR points and surrounding LIDAR points with determined rough or fuzzy characteristics may be filtered.

As indicated above, in the illustrated example of FIG. 9B, the keypoints 970 may be 3D keypoints. The system 900 may be configured to annotate the HD map data with keypoint data that indicates the locations of the keypoints 970 in the HD map 912. For example, based on the locations in the HD map 912 of the map points that correspond to the 3D keypoints (e.g., as identified from the LIDAR scans) the locations of the keypoints 970 within the HD map 912 may be identified. The map points that correspond to the keypoints 970 may be annotated as corresponding to respective keypoints 970 such that the locations of the keypoints 970 may be indicated in the HD map data. In some embodiments, the locations of one or more keypoints 970 may be determined based on matching 2D keypoints that each correspond to the same features and used to generate the same 3D keypoint. Additionally or alternatively, multiple of the same 3D keypoints may be generated with respect to different matching 2D keypoints from different keyframes and the locations of one or more of the keypoints 970 may be based on the locations of the different matching 3D keypoints.

For example, the system 900 may project the matching keypoints (2D and/or 3D) onto the HD map 912 by identifying the corresponding map points of the matching keypoints. The corresponding map points may differ for the different matching keypoints based on different perspectives associated with the keyframes associated with the matching keypoints. In some embodiments, the system 900 may determine which of the map points (and corresponding map locations) to associate with the keypoint of the matching keypoints based on reducing or minimizing a reprojection error that relates to discrepancies between which map points correspond to the common features of the matching keypoints.

In these or other embodiments, the keypoint data may indicate the identified features of the keypoints. Additionally or alternatively, the keypoint data may indicate and/or include the keyframes that include the respective keypoints. In these or other embodiments, the keypoint data may include the 3D and/or 2D representation of the features or objects that correspond to the respective keypoints 970. In some embodiments, the system 900 may store the six-dimensional alignment, location, and/or orientation of the keypoints 970 in the HD map data as part of indicating the location of the keypoints 970 in the HD map 912.

Image-Based Localization

As indicated above, the annotation of the HD map data with the keypoint data may improve image-based localization. An example of which is described below with respect to the vehicle 950 travelling in the region 901 represented by the HD map 912. In some embodiments, the system 900 (e.g., via the vehicle computing system 920) may determine poses of the vehicle 950 by comparing data obtained from LIDARs, HD maps, GPSs, camera images, videos, etc. In some embodiments, a pose may include a representation of the alignment, location, and/or orientation of the vehicle 950 based on sensor data and/or data obtained from LIDARs, HD maps, GPSs, camera images, videos, etc. In some embodiments, the pose may be used for alignment, location, and/or orientation purposes. In some embodiments, the pose may be used to identify one or more sets of keypoints 970 that may individually and/or collectively represent the alignment, location, and/or orientation of the vehicle 950 relative to sensor data and/or data obtained from LIDARs, HD maps, GPSs, camera images, videos, etc. In some embodiments, the pose may include a six-dimensional alignment, location, and/or orientation (e.g., x, y, z, roll, pitch, and yaw) of the vehicle 950 based on sensor data and/or data obtained from LIDARs, HD maps, GPSs, camera images, videos, etc. For example, the system 900 may obtain sensor data from a LIDAR sensor fixed to the vehicle 950 from the region 901 and HD map data for the same or a similar region.

In some embodiments, the vehicle 950 may have one or more cameras mounted to a portion of the vehicle 950. In some embodiments, as the vehicle 950 is driving along a given path, one or more cameras of the vehicle 950 may capture images and the system 900 may compare the camera images against the keypoints 970 within a threshold distance of a sensor pose 972 of the vehicle 950. In some embodiments, the system 900 may find keypoint correspondences between the camera images and the keypoints 970 and may use the keypoint correspondences to determine a camera pose 976 of the vehicle 950.

For example, in some embodiments, a camera of the vehicle 950 may capture images and the system 900 (e.g., via the vehicle computing system 920) may match points of interest of the camera images with points of interest of the keypoints 970 to find keypoint correspondences for determining poses of the vehicle 950. In some embodiments, the system 900 may also perform image-based localization by recognizing the keypoints 970 across images by matching images. For example, the system 900 may determine the keypoints 970 from a first image match with or correspond to one or more keypoints from a second image. In some embodiments, the system 900 may determine a camera pose of a vehicle 950 based on the matching of camera images with previously identified keypoints 970. For example, the system 900 may determine a camera pose 976 of the vehicle 950 based on keypoints 970 that may be determined from a camera image that may match with or correspond to one or more previously identified keypoints 970 from a second camera image or from another source.

The keypoints 970 may each have associated therewith corresponding keypoint data, that may be included in the HD map data of the HD map 912. The keypoint data may represent a respective feature of the region 901 at a corresponding location of the respective keypoint 970. For example, first keypoint data may represent a first feature of the region 901 at a first location of the keypoint 970a, second keypoint data may represent a second feature of the region 901 at a second location of the keypoint 970b, etc. In some embodiments, the keypoint data may include images of the respective keypoints 970 and/or representations of features of the respective keypoints 970 that may indicate features that may be identified from images captured by cameras. Further, the keypoints 970 and corresponding features may be selected based on general uniqueness of the features and the keypoints and relative uniqueness with respect to each and surrounding features such that the keypoints 970 are relatively easier to identify and be distinguished from other elements of the region 901.

In some embodiments, the computing system 920 may compare sensor data from the vehicle sensors 905 and HD map data from the HD map system 910 to determine a sensor pose 972 illustrated in FIG. 9B. The sensor pose 972 may represent the alignment, location, and/or orientation of the sensor and/or vehicle 950 relative to the HD map 912 of the region 901 with a first degree of accuracy.

In some embodiments, the system 900 may use sensor pose 972 as an initial estimate of the location of the vehicle 950 in the region 901. In some embodiments, the sensor pose 972 may have a particular degree of accuracy. The degree of accuracy may be a measurement of the accuracy of a representation of the alignment, location, and/or orientation of the vehicle sensors 905 and/or vehicle 950 in the region 901 as compared with the actual alignment, location, and/or orientation of the vehicle sensors 905 and/or vehicle 950 in the region 901. For example, the particular degree of accuracy of the sensor pose 972 may be within 1-3 meters or better.

In some embodiments, the particular degree of accuracy of the sensor pose 972 may be limited by the inaccuracies and/or errors in the data used to determine the sensor pose 972. For example, the system 900 may use vehicle sensor data from vehicle sensors 905 that may be obtained from LIDAR scans from one or more LIDARs or GPS data that may be obtained from one or more GPSs and HD map data to determine the sensor pose 972. The vehicle sensor data and HD map data may be subject to the inaccuracies and/or errors introduced by one or more of the LIDAR, GPS, and HD map 912. Additionally or alternatively, due to the rates at which the vehicle sensor data may be obtained and depending on the velocity of the vehicle 950, a first sensor pose 972 determined with respect to a first sensor data that is read at a time "t1" may be inaccurate with respect to an actual location of the vehicle at a time "t2" that is after time "t1" but before a second sensor reading time "t3" of second sensor data that may be used to determine a second sensor pose 972.

In some embodiments, the system 900 may use the sensor poses 972 as a starting place to determine a more precise estimate of the alignment, location, and/or orientation of the vehicle sensors 905 and/or vehicle 950 in the region 901.

In some embodiments, the system 900 may use the sensor poses 972 as a starting place to determine a more precise estimate of the alignment, location, and/or orientation of the vehicle sensors 905 and/or vehicle 950 in the region 901. In some embodiments, the system 900 may use the sensor poses 972 and one or more sets of keypoints 970 to determine one or more camera poses 976 to obtain the more precise estimate. In some embodiments, the camera poses 976 may have a particular degree of accuracy. In some embodiments, the camera poses 976 may have a higher degree of accuracy than the sensor poses 972. For example, the particular degree of accuracy of the sensor poses 972 may be within 30 cm or better. In some embodiments, the camera pose 976 may be used to align, locate, and/or orient a camera and/or vehicle or may be used to assist in the navigation of a vehicle.

For example, the vehicle 950 may have moved in a direction indicated by arrow 980 since the capturing of the sensor data (e.g., LIDAR data) used to determine the sensor pose 972. The speed of the vehicle 950 and the amount of time may thus affect the first degree of accuracy of the sensor pose 972. For example, as illustrated in FIG. 9B, the sensor pose 972 may be toward the back of the vehicle 950 but may be meant to indicate the pose of the vehicle 950 toward the front of the vehicle 950.

As another example, the sensor pose 972 may be obtained based on GPS data that may have a margin of error of a few meters. In the illustrated example of FIG. 9B, the sensor pose 972 may be toward the back of the vehicle 950 instead of the toward the front of the vehicle 950 even though the sensor pose 972 is meant to be toward the front of the vehicle 950 due to the GPS inaccuracy. The first degree of accuracy in this example may correspond to the degree of accuracy of the GPS data.

In some embodiments, the system 900 may perform the following operations. In some embodiments, the system 900 may associate points or sets of points in a point cloud of the HD map 910 (e.g., OMap) with features and may identify them as keypoints 970 as described above. In some embodiments, the system 900 may be configured to translate, rotate, and scale the point cloud of the HD map 910. In some embodiments, as also indicated above, the system 900 may store locations of the keypoints 970 with the HD map data of the HD map 912. In some embodiments, the system 900 may use these stored locations to identify keypoints 970 within a specified distance of a location, for example, by performing a radius search, for example, using a radius 974. Accordingly, in some embodiments, the system 900 may determine an approximate location of the vehicle 950 by matching sensor scan data with the point cloud of the HD map 910 (e.g., using an ICP (iterative closest point) technique) and may identify keypoints 970 that may be likely to be visible from the location of the vehicle 950. In some embodiments, the system 900 may search for the identified keypoints 970 in the camera images that may be captured by the vehicle 950. In some embodiments, the system 900 may be able to perform a sensor pose 972 determination at a lower frequency compared to camera pose 976 determination because capturing a sensor scan may take longer than capturing a camera image. Accordingly, in some embodiments, for each sensor pose determination, the system 900 may perform a plurality of camera pose 976 determinations until the computing system 920 may perform a subsequent sensor pose 972 determination.

In some embodiments, the computing system 920 may identify a set of keypoints 970 that may be within a threshold distance of the sensor pose 972. For example, the computing system 920 may identify a set of keypoints, including keypoints 970b, 970c, 970d, and 970f, which may be within the radius 974 of the sensor pose 972.

In some embodiments, the set of keypoints that are within the threshold distance of the sensor pose 972 may be used to determine a camera pose 976 of the vehicle 950. For example, the computing system 920 may obtain one or more camera images of the region 901. For example, the computing system 920 may obtain one or more camera images of the region 901 that are captured by one or more cameras the vehicle sensors 905. The computing system 920 may compare the one or more camera images against the keypoint data of the set of keypoints, for example, keypoint data associated with keypoints 970b, 970c, 970d, and 970f, to identify one or more matching keypoints that are included in the one or more camera images. The matching keypoints may be those keypoints 970 of the set of the keypoints 970*b*, 970*c*, 970*d*, and 970*f* that may be depicted in the camera images.

The comparing of the keypoint data against the camera images may include comparing the camera images against images included in the keypoint data. Additionally or alternatively, the comparing of the keypoint data against the camera images may include performing image processing on the camera images to identify particular features of objects included in the camera images and comparing the identified features to those included in the keypoint data. The features included in the keypoint data may be identified by performing image processing on images included in the keypoint data in some embodiments. Additionally or alternatively, the computing system 920 may be configured to focus mainly on or prioritize the keypoint data of the set of keypoints 970*b*, 970*c*, 970*d*, and 970*f* in comparing the captured images against other HD map data of the region 901. In these or other embodiments, the computing system 920 may only compare the images against the keypoint data of the set of keypoints 970*b*, 970*c*, 970*d*, and 970*f*.

The computing system 920 may determine a camera pose 976 of the vehicle 950 based on the one or more matching keypoints 970. For example, the computing system 920 may determine a camera pose 976 of the vehicle 950 based on the one or more matching keypoints 970*b*, 970*c*, 970*d*, and 970*f*. The camera pose 976 may indicate a location of the vehicle 950 within the HD map 912. In some embodiments, the camera pose 976 may indicate a location of the vehicle 950 within the HD map 912, with a second degree of accuracy which may be higher than the first degree of accuracy of the sensor pose 972. The uniqueness of the keypoints 970 and the focusing on the keypoint data in determining matching keypoints and the camera pose 976 may allow for a faster and more accurate determination of the camera pose 976 by directing the image comparing toward elements that may be easier to identify and more accurately identified.

In some embodiments, the vehicle computing system 920 may use the keypoint data for the keypoints 970*b*, 970*c*, 970*d*, and 970*f*, sensor pose 972, camera pose 976, etc. to the vehicle computing system 920 to assist with the navigation of the vehicle 950.

In some embodiments, the system 900 may receive sensor scans from one or more vehicle sensors 905 as the vehicle 950 navigates along a route. In some embodiments, the system 900 may determine the sensor pose 972 based on the sensor data. In some embodiments, the system 900 may use the sensor pose 972 to identify keypoints 970 near the sensor pose 972, for example, by identifying keypoints 970 within a threshold distance of the sensor pose 972 as determined by performing a search within a predetermined radius, for example, within the radius 974. In some embodiments, the threshold distance may be based on the Euclidean distance between the sensor pose 972 and the identified keypoints 970. The system 900 may receive camera images and may perform matches between the identified set of keypoints 970 and camera image data to determine correspondences between camera images and keypoints 970. In some embodiments, the sensor-based localization based on the sensor pose 972 may help narrow the search for the image-based localization to a small set of keypoints 970 that may be local to the position of the vehicle 950. Accordingly, in some embodiments, the image-based localization techniques disclosed herein may improve performance of the system 900 or may improve the precision, accuracy, or speed of the vehicle localization because the search for keypoints 970 may performed using a small set of keypoints 970 that may be local to the given region 901 where the vehicle 950 may be determined to be present based on sensor localization. In some embodiments, the image-based localization may also assist to fully constrain or more fully constrain the alignment, location, and/or orientation of the camera and/or vehicle 950, to reduce uncertainty, mismatches, and/or errors that may be present in the sensor localization data.

In some embodiments, the system 900 may determine and store transformations for mapping from a sensor pose 972 to a camera pose 976 based on the known position of the camera with respect to the sensor. Accordingly, in some embodiments, given a LIDAR-based pose, the system 900 can determine a corresponding camera pose 976.

In some embodiments, the system 900 may use scale-invariant feature transform (SIFT) to identify keypoints 970 and keyframes. Details of the SIFT algorithm may be disclosed in the U.S. Pat. No. 6,711,293 filed on Mar. 6, 2000 which is incorporated by reference herein. The SIFT techniques may transform an image into a collection of feature vectors, each of which may be invariant to image translation, scaling, and rotation, and may be partially invariant to illumination changes and robust to local geometric distortion.

In some embodiments, the system 900 may perform RANSAC (random sample consensus) based on triangulation for matching keypoints of a new image with previously stored keypoints 970.

In some embodiments, the system 900 may associate points with semantics and may use the semantics to make keypoint matching more reliable. Accordingly, in some embodiments, the system may determine semantics of the objects in camera images and may compare or match them with semantics of objects in the HD map to perform correspondences.

In some embodiments, the system 900 may be able to use the sensor poses 972 to shorten the time and/or resources required to determine a more precise estimate of the alignment, location, and/or orientation of the sensor and/or vehicle 950 in a given region 901. For example, the system 900 may use one or more sensor poses 972 to narrow the region from which one or more camera images are obtained. The narrowing of the region may reduce the number of mismatches that may occur between one or more sets of keypoints 970 within a threshold distance of the one or more sensor poses 972 and the camera pose 976 of the vehicle 950. The reduction of the number of mismatches may result in error reduction in the localization of the vehicle 950 and less overall drain on the system 900. In some instances, an additional, more precise, and/or modified estimate of the alignment, location, and/or orientation may be utilized to more accurately navigate the vehicle 950 through the region 901.

Figure 10:
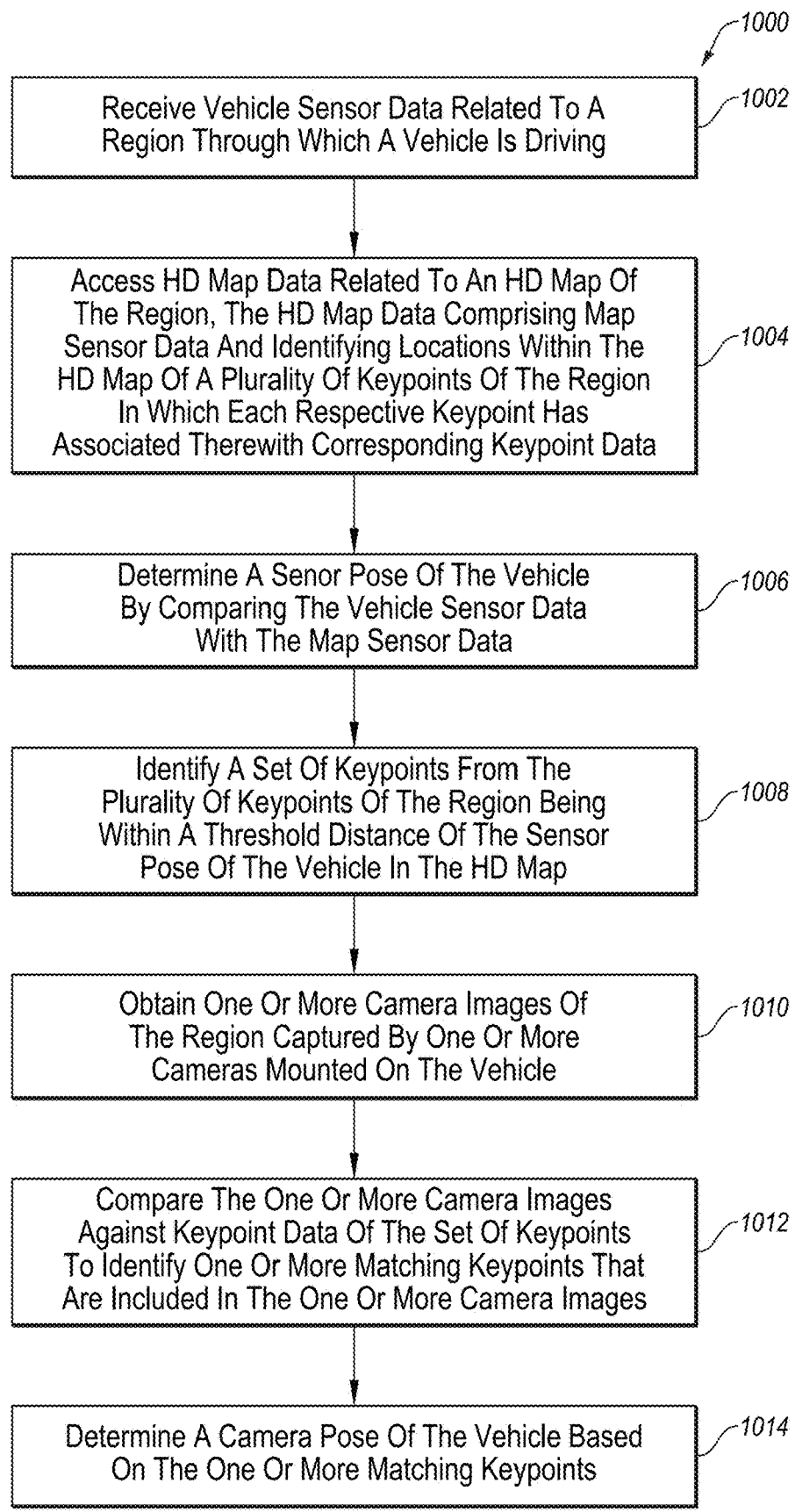
FIG. 10 illustrates a flowchart an example method of image-based localization for vehicles.

FIG. 10 is a flowchart of an example method 1000 of image-based localization for vehicles, according to at least one embodiment described in the present disclosure. The method 1000 may be performed by any suitable system, apparatus, or device. For example, one or more elements of the HD map system 100 of FIG. 1 may be configured to perform one or more of the operations of the method 1000. Additionally or alternatively, the vehicle computing system 120 may be configured to perform one or more of the operations associated with the method 1000. Although illustrated with discrete blocks, the steps and operations associated with one or more of the blocks of the method 1000 may be divided into additional blocks, combined into fewer blocks, or eliminated, depending on the particular implementation.

At block 1002, vehicle sensor data related to a region through which a vehicle may be driving may be received. The vehicle sensor data may be received via the vehicle computing system 120 and may include data obtained from LIDAR scans from one or more LIDARs, GPS data obtain from one or more GPS s, and/or HD map data.

At block 1004, HD map data related to an HD map of the region may be accessed. The HD map data may comprise map sensor data and may identify locations within the HD map of a plurality of keypoints of the region in which each respective keypoint has associated corresponding keypoint data that may represent a respective feature of the region at a corresponding location of the respective keypoint. The vehicle computing system 120 may receive the HD map data from the online map system.

At block 1006, a sensor pose of the vehicle may be determined by comparing the vehicle sensor data with the map sensor data. The sensor pose may indicate a location of the vehicle within the HD map within a first degree of accuracy.

At block 1008, a set of keypoints from the plurality of keypoints of the region based on each keypoint of the set of keypoints being within a threshold distance of the sensor pose of the vehicle in the HD map may be identified. The identification of the set of keypoints from the plurality of keypoints of the region may be indicated by the HD map data. The identifying the set of keypoints from the plurality of keypoints may comprise identifying one or more objects in the HD map data and extracting one or more points of interest from one or more objects. Each keypoint of the set of keypoints may correspond to one or more points of interest within the HD map data.

At block 1010, one or more camera images of the region captured by one or more cameras mounted on the vehicle may be obtained.

At block 1012, the one or more camera images may be compared against keypoint data of the set of keypoints to identify one or more matching keypoints that are included in the one or more camera images. The comparing the one or more camera images against keypoint data of the set of keypoints may comprise identifying one or more objects in the one or more camera images and extracting one or more points of interest from the one or more objects. The one or more matching keypoints may correspond to one or more points of interest within the one or more camera images.

At block 1014, a camera pose of the vehicle based on the one or more matching keypoints may be determined. The camera pose may indicate the location of the vehicle within the HD map within a second degree of accuracy that may be higher than the first degree of accuracy.

Modifications, additions, or omissions may be made to the method 1000 without departing from the scope of the present disclosure. For example, the operations of method 1000 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

Figure 11:
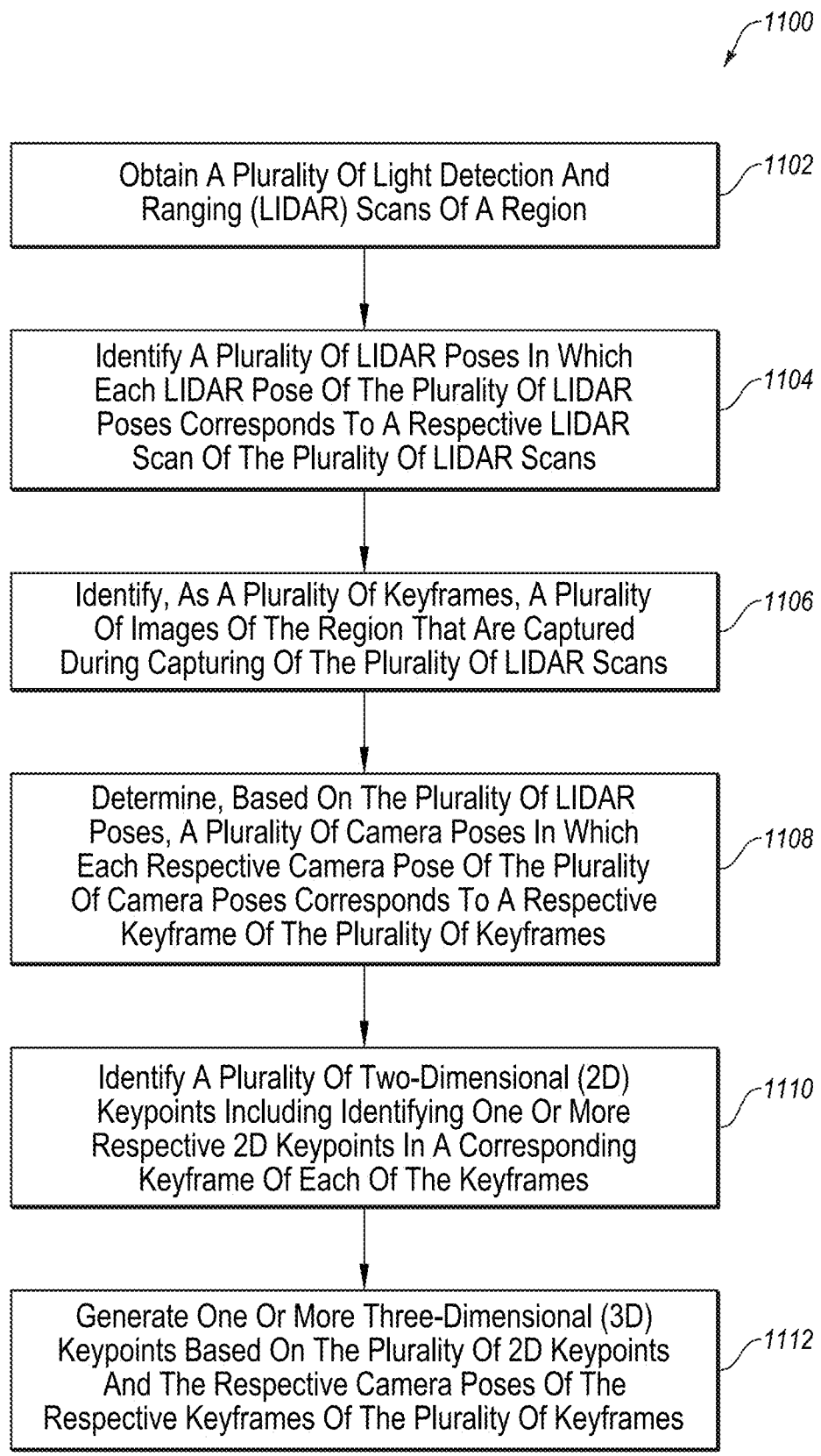
FIG. 11 is a flowchart of an example method of image-based keypoint generation.

FIG. 11 is a flowchart of an example method 1100 of image-based keypoint generation, according to at least one embodiment described in the present disclosure. The method 1100 may be performed by any suitable system, apparatus, or device. For example, one or more elements of the HD map system 100 of FIG. 1 may be configured to perform one or more of the operations of the method 1100. Additionally or alternatively, the vehicle computing system 120 may be configured to perform one or more of the operations associated with the method 1100. Although illustrated with discrete blocks, the steps and operations associated with one or more of the blocks of the method 1100 may be divided into additional blocks, combined into fewer blocks, or eliminated, depending on the particular implementation.

At block 1102, a plurality of scans may be obtained for a region. In some embodiments, the scans may include LIDAR scans of the region. In some embodiments, the LIDAR scans may be obtained such as described above with respect to FIGS. 9A and 9B. For example, the LIDAR scans may be obtained by one or more vehicles travelling through the region. Additionally or alternatively, the LIDAR scans may be included in an HD map of the region.

At block 1104, a plurality of LIDAR poses may be identified. In some embodiments, each LIDAR pose of the plurality of LIDAR poses may correspond to a respective LIDAR scan of the plurality of LIDAR scans. In some embodiments, the LIDAR poses may be identified such as described above with respect to FIGS. 9A and 9B. For example, identifying the LIDAR poses may include obtaining the LIDAR poses from map data of the HD map of the region. In these or other embodiments, identifying the LIDAR poses may include determining one or more of the LIDAR poses based on localization performed with respect to the corresponding the LIDAR scans of the one or more LIDAR poses. Additionally or alternatively, identifying the plurality of LIDAR poses includes determining the plurality of LIDAR poses with respect to relative locations of each other.

At block 1106, a plurality of images of the region that are captured during capturing of the plurality of LIDAR scans may be identified as keyframes. In some embodiments, the keyframes may be identified such as described above with respect to FIGS. 9A and 9B. For example, in some embodiments, identifying the keyframes may include selecting keyframes that correspond to a particular distance between camera poses that satisfy a threshold distance difference between each other.

At block 1108, a plurality of camera poses may be identified based on the plurality of LIDAR poses. In some embodiments, each respective camera pose of the plurality of camera poses may correspond to a respective keyframe of the plurality of keyframes. In some embodiments, the camera poses may be identified such as described above with respect to FIGS. 9A and 9B.

At block 1110, a plurality of two-dimensional (2D) keypoints may be identified. Identifying the 2D keypoints may include identifying one or more respective 2D keypoints in a corresponding keyframe of each of the keyframes. In some embodiments, each respective 2D keypoint corresponds to a respective feature of the region as included in the corresponding keyframe. In some embodiments, the 2D keypoints may be identified such as described above with respect to FIGS. 9A and 9B.

For example, identifying the 2D keypoints may include identifying, as the 2D keypoints, matching keypoints that each correspond to multiple of the keyframes. In these or other embodiments, identifying the 2D keypoints may include identifying one or more common features that correspond to multiple keyframes and identifying the one or more common features as one or more of the 2D keypoints. Additionally or alternatively, identifying the 2D keypoints may include identifying as the 2D keypoints, matching keypoints that each correspond to a threshold number of the keyframes.

At block 1112, one or more three-dimensional (3D) keypoints may be generated. The 3D keypoints may be generated based on the plurality of 2D keypoints and the respective camera poses of the respective keyframes of the plurality of keyframes, such as described above.

Modifications, additions, or omissions may be made to the method 1100 without departing from the scope of the present disclosure. For example, the operations of method 1100 may be implemented in differing order. Additionally or alternatively, two or more operations may be performed at the same time. Furthermore, the outlined operations and actions are only provided as examples, and some of the operations and actions may be optional, combined into fewer operations and actions, or expanded into additional operations and actions without detracting from the essence of the disclosed embodiments.

For example, in some embodiments, the method 1100 may include determining correspondences between LIDAR points of the plurality of LIDAR scans and the one or more 3D keypoints and filtering the one or more 3D keypoints based on the determined correspondences. In these or other embodiments, the filtering may include removing 3D keypoints that do not correspond to LIDAR points of the plurality of LIDAR scans, keeping 3D keypoints that correspond to one or more respective LIDAR points of the LIDAR scans, keeping 3D keypoints that correspond to a threshold number of respective LIDAR points of the LIDAR scans, or any suitable combination thereof. Additionally or alternatively, the filtering may be based on determined characteristics of the one or more 3D keypoints. The determined characteristics may be based on one or more of: determined semantics of the 3D keypoints; or determined characteristics of LIDAR points that correspond to the 3D keypoints in some embodiments.

Additionally or alternatively, the method 1100 may include annotating map data of a high definition (HD) map of the region with keypoint data that corresponds to the one or more 3D keypoints. For example, the method 1100 may include identifying a plurality of locations within the HD map in which each respective location of the plurality of locations corresponds to a respective 3D keypoint and annotating map data of the HD map with keypoint data that indicates the respective locations of the respective 3D keypoints.

Computer System Architecture

Figure 12:
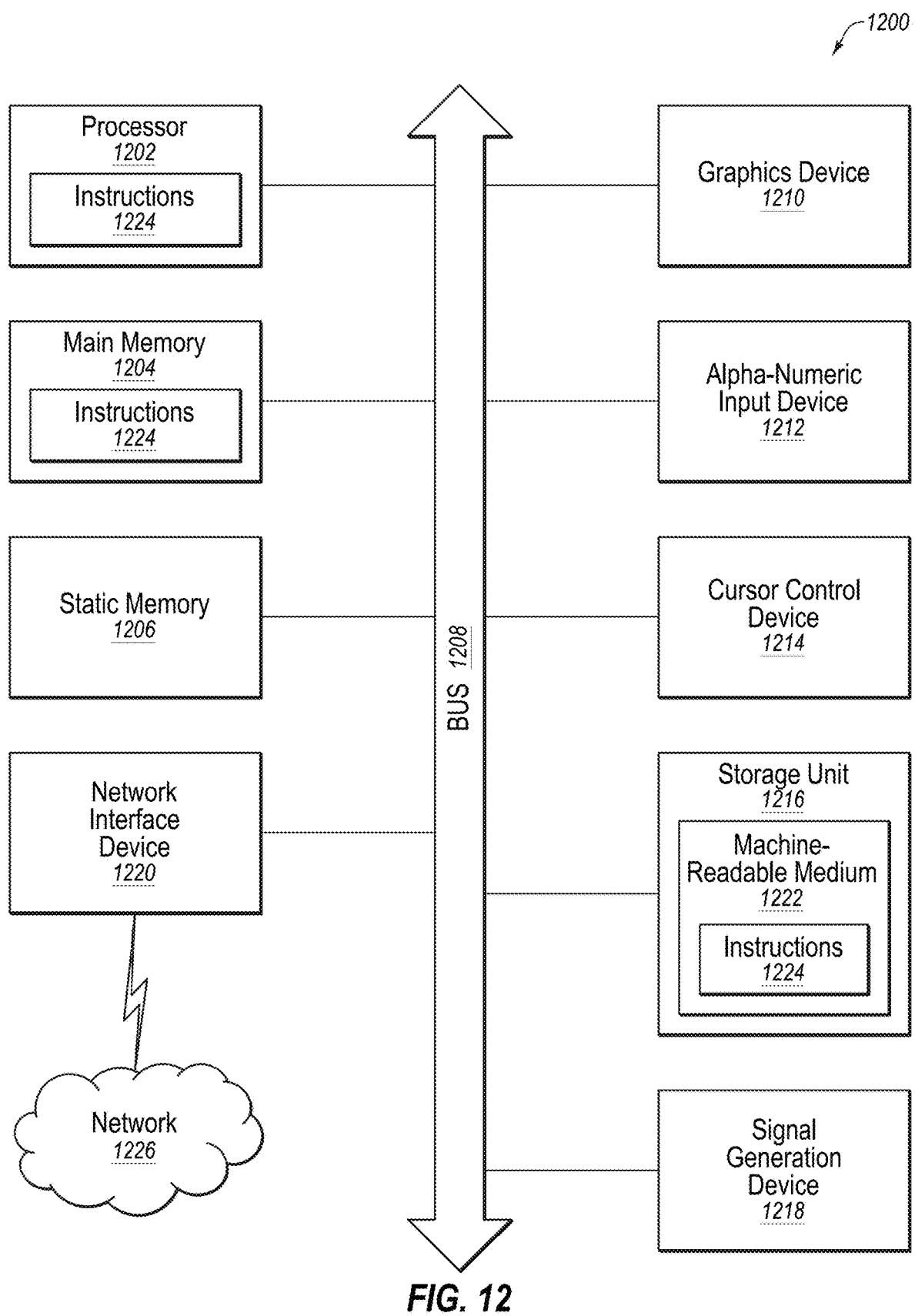
FIG. 12 illustrates an example embodiment of a computing machine that can read instructions from a machine-readable medium and execute the instructions in a processor or controller.

FIG. 12 is a block diagram illustrating various components of an example computer system that may read instructions from a machine-readable medium and may execute them in a processor (or controller). Specifically, FIG. 12 illustrates a diagrammatic representation of a machine in the example form of a computer system 1200 within which instructions 1224 (e.g., software) for causing the machine to perform any one or more of the methodologies discussed herein may be executed. In some embodiments, the machine may operate as a standalone device or may be connected (e.g., networked) to other machines. In some embodiments, the machine may operate, in a networked development, in the capacity of a server machine or a client machine in a server-client network environment, or as a peer machine in a peer-to-peer (or distributed) network environment.

In some embodiments, the machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1224 (sequential or otherwise) that may specify actions to be taken by the machine. Further, while only a single machine is illustrated, the term "machine" may also be taken to include any collection of machines that individually or jointly execute instructions 1224 to perform any one or more of the methodologies discussed herein.

In some embodiments, the example computer system 1200 may be part of or may be any applicable system described in the present disclosure. For example, the online HD map system 120 and/or the vehicle computing system 120 described above may comprise the computer system 1200 or one or more portions of the computer system 1200. Further, in some embodiments, different implementations of the computer system 1200 may include more or fewer components than those described herein. For example, a particular computer system 1200 may not include one or more of the elements described herein and/or may include one or more elements that are not explicitly discussed.

In some embodiments, the example computer system 1200 may include a processor 1202 (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 1204, and a static memory 1206, which may be configured to communicate with each other via a bus 1208. In some embodiments, the computer system 1200 may further include graphics display unit 1210 (e.g., a plasma display panel (PDP), a liquid crystal display (LCD), a projector, or a cathode ray tube (CRT)). In some embodiments, the computer system 1200 may also include alphanumeric input device 1212 (e.g., a keyboard), a cursor control device 1214 (e.g., a mouse, a trackball, a joystick, a motion sensor, or other pointing instrument), a storage unit 1216, a signal generation device 1218 (e.g., a speaker), and a network interface device 1220, which may be configured to communicate via the bus 1208.

In some embodiments, the storage unit 1216 may include a machine-readable medium 1222 on which is stored instructions 1224 (e.g., software) embodying any one or more of the methodologies or functions described herein. In some embodiments, the instructions 1224 (e.g., software) may also reside, completely or at least partially, within the main memory 1204 or within the processor 1202 (e.g., within a processor's cache memory) during execution thereof by the computer system 1200, the main memory 1204 and the processor 1202 also constituting machine-readable media. The instructions 1224 (e.g., software) may be transmitted or received over a network 1226 via the network interface device 1220.

While machine-readable medium 1222 is shown in an example embodiment to be a single medium, the term "machine-readable medium" may be taken to include a single medium or multiple media (e.g., a centralized or distributed database, or associated caches and servers) able to store instructions (e.g., instructions 1224). The term "machine-readable medium" may also be taken to include any medium that is capable of storing instructions (e.g., instructions 1224) for execution by the machine and that cause the machine to perform any one or more of the methodologies disclosed herein. The term "machine-readable medium" may include, but not be limited to, data repositories in the form of solid-state memories, optical media, and magnetic media.

Additional Configuration Considerations

The foregoing description has been presented for the purpose of illustration; it is not intended to be exhaustive or to be limiting in any way. Persons skilled in the relevant art may appreciate that many modifications and variations may be possible in light of the above disclosure.

For example, although the techniques described herein may be applied to autonomous vehicles, the techniques can also be applied to other applications, for example, for displaying HD maps for vehicles with drivers, for displaying HD maps on displays of client devices such as mobile phones, laptops, tablets, or any computing device with a display screen. Techniques displayed herein may also be applied for displaying maps for purposes of computer simulation, for example, in computer games, etc.

Some portions of this description may describe the embodiments in terms of algorithms and symbolic representations of operations on information. These algorithmic descriptions and representations may be commonly used by those skilled in the data processing arts to convey the substance of their work effectively to others skilled in the art. These operations, while described functionally, computationally, or logically, may be understood to be implemented by computer programs or equivalent electrical circuits, microcode, etc. Furthermore, it may be proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module may be implemented with a computer program product comprising a computer-readable medium containing computer program code, which may be executed by a computer processor for performing any or all of the steps, operations, or processes described.

Embodiments may also relate to an apparatus for performing the operations herein. This apparatus may be specially constructed for the disclosed purposes, and/or it may comprise a general-purpose computing device selectively activated or reconfigured by a computer program stored in the computer. Such a computer program may be stored in a tangible computer readable storage medium or any type of media suitable for storing electronic instructions and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal may include any embodiment of a computer program product or other data combination described herein. The computer data signal may be a product that may be presented in a tangible medium or carrier wave and modulated or otherwise encoded in the carrier wave, which may be tangible, and transmitted according to any suitable transmission method.

In addition, the language used in the specification may have been principally selected for readability and instructional purposes and may not have been selected to delineate or circumscribe the inventive subject matter. It may therefore be intended that the scope of the invention may not be limited by this detailed description but rather by any claims that issue on an application based hereon.

As used herein, the terms "module" or "component" may refer to specific hardware implementations configured to perform the operations of the module or component and/or software objects or software routines that may be stored on and/or executed by general-purpose hardware (e.g., computer-readable media, processing devices, etc.) of the computing system. In some embodiments, the different components, modules, engines, and services described herein may be implemented as objects or processes that execute on the computing system (e.g., as separate threads). While some of the system and methods described herein are generally described as being implemented in software (e.g., stored on and/or executed by general purpose hardware), specific hardware implementations or a combination of software and specific hardware implementations are also possible and contemplated. In this description, a "computing entity" may be any computing system as previously defined herein, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc.", or "at least one of A, B, or C, etc." or "one or more of A, B, or C, etc." is used, in general such a construction is intended to include A alone, B alone, C alone, A and B together, A and C together, B and C together, or A, B, and C together, etc. Additionally, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B" even if the term "and/or" is used elsewhere.

All examples and conditional language recited in the present disclosure are intended for pedagogical objects to aid the reader in understanding the present disclosure and the concepts contributed by the inventor to furthering the art and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A method, comprising:
obtaining a plurality of light detection and ranging (LIDAR) scans of a region;
identifying a plurality of LIDAR poses in which each LIDAR pose of the plurality of LIDAR poses corresponds to a respective LIDAR scan of the plurality of LIDAR scans;
identifying, as a plurality of keyframes, a plurality of images of the region that are captured during capturing of the plurality of LIDAR scans;
determining, based on the plurality of LIDAR poses, a plurality of camera poses in which each respective camera pose of the plurality of camera poses corresponds to a respective keyframe of the plurality of keyframes;
identifying a plurality of two-dimensional (2D) keypoints including identifying one or more respective 2D keypoints in a corresponding keyframe of each of the keyframes, wherein each respective 2D keypoint corresponds to a respective feature of the region as included in the corresponding keyframe; and
generating one or more three-dimensional (3D) keypoints based on the plurality of 2D keypoints and the respective camera poses of the respective keyframes of the plurality of keyframes.

2. The method of claim 1, wherein identifying the plurality of 2D keypoints includes identifying, as the plurality of 2D keypoints, matching keypoints that each correspond to multiple of the keyframes.

3. The method of claim 1, further comprising:
determining correspondences between LIDAR points of the plurality of LIDAR scans and the one or more 3D keypoints; and
filtering the one or more 3D keypoints based on the determined correspondences.

4. The method of claim 3, wherein filtering the one or more 3D keypoints includes removing 3D keypoints that do not correspond to LIDAR points of the plurality of LIDAR scans.

5. The method of claim 3, wherein filtering the one or more 3D keypoints is further based on determined characteristics of the one or more 3D keypoints, wherein the determined characteristics are based on one or more of:
determined semantics of the 3D keypoints; or
determined characteristics of LIDAR points that correspond to the 3D keypoints.

6. The method of claim 3, wherein filtering the one or more 3D keypoints includes keeping 3D keypoints that correspond to one or more respective LIDAR points of the LIDAR scans.

7. The method of claim 3, wherein filtering the one or more 3D keypoints includes keeping 3D keypoints that correspond to a threshold number of respective LIDAR points of the LIDAR scans.

8. The method of claim 1, wherein the plurality of LIDAR scans are included in a high definition (HD) map of the region.

9. The method of claim 8, further comprising:
identifying a plurality of locations within the HD map in which each respective location of the plurality of locations corresponds to a respective 3D keypoint; and
annotating map data of the HD map with keypoint data that indicates the respective locations of the respective 3D keypoints.

10. The method of claim 1, further comprising annotating map data of a high definition (HD) map of the region with keypoint data that corresponds to the one or more 3D keypoints.

11. The method of claim 1, wherein identifying the plurality of keyframes includes selecting keyframes that correspond to a particular distance between camera poses that satisfy a threshold distance difference between each other.

12. The method of claim 1, wherein identifying the plurality of 2D keypoints includes:
identifying one or more common features that correspond to multiple keyframes; and
identifying the one or more common features as one or more of the plurality of 2D keypoints.

13. The method of claim 1, wherein identifying the plurality of 2D keypoints includes identifying as the plurality of 2D keypoints matching keypoints that each correspond to a threshold number of the keyframes.

14. The method of claim 1, wherein identifying the plurality of LIDAR poses includes obtaining the plurality of LIDAR poses from map data of a high definition (HD) map of the region.

15. The method of claim 1, wherein identifying the plurality of LIDAR poses includes determining one or more of the plurality of LIDAR poses based on localization performed with respect to corresponding LIDAR scans.

16. The method of claim 1, wherein identifying the plurality of LIDAR poses includes determining the plurality of LIDAR poses with respect to relative locations of each other.

17. One or more non-transitory computer readable storage media storing instructions that, in response to being executed by one or more processors, cause a system to perform operations, the operations comprising:
obtaining a plurality of light detection and ranging (LIDAR) scans of a region;
identifying a plurality of LIDAR poses in which each LIDAR pose of the plurality of LIDAR poses corresponds to a respective LIDAR scan of the plurality of LIDAR scans;
identifying, as a plurality of keyframes, a plurality of images of the region that are captured during capturing of the plurality of LIDAR scans;
determining, based on the plurality of LIDAR poses, a plurality of camera poses in which each respective camera pose of the plurality of camera poses corresponds to a respective keyframe of the plurality of keyframes;
identifying a plurality of two-dimensional (2D) keypoints including identifying one or more respective 2D keypoints in a corresponding keyframe of each of the keyframes, wherein each respective 2D keypoint corresponds to a respective feature of the region as included in the corresponding keyframe; and
generating one or more three-dimensional (3D) keypoints based on the plurality of 2D keypoints and the respective camera poses of the respective keyframes of the plurality of keyframes.

18. The one or more computer readable storage media of claim 17, wherein the operations further comprise:

determining correspondences between LIDAR points of the plurality of LIDAR scans and the one or more 3D keypoints; and filtering the one or more 3D keypoints based on the determined correspondences.

19. A system comprising:

one or more processors; and one or more non-transitory computer readable storage media storing instructions that, in response to being executed by the one or more processors, cause the system to perform operations, the operations comprising:

obtaining a plurality of light detection and ranging (LIDAR) scans of a region;

identifying a plurality of LIDAR poses in which each LIDAR pose of the plurality of LIDAR poses corresponds to a respective LIDAR scan of the plurality of LIDAR scans;

identifying, as a plurality of keyframes, a plurality of images of the region that are captured during capturing of the plurality of LIDAR scans;

determining, based on the plurality of LIDAR poses, a plurality of camera poses in which each respective camera pose of the plurality of camera poses corresponds to a respective keyframe of the plurality of keyframes;

identifying a plurality of two-dimensional (2D) keypoints including identifying one or more respective 2D keypoints in a corresponding keyframe of each of the keyframes, wherein each respective 2D keypoint corresponds to a respective feature of the region as included in the corresponding keyframe; and generating one or more three-dimensional (3D) keypoints based on the plurality of 2D keypoints and the respective camera poses of the respective keyframes of the plurality of keyframes.

20. The system of claim 19, wherein the operations further comprise:

determining correspondences between LIDAR points of the plurality of LIDAR scans and the one or more 3D keypoints; and filtering the one or more 3D keypoints based on the determined correspondences.

\* \* \* \* \*